(12) United States Patent
Chen et al.

(10) Patent No.: US 11,921,325 B2
(45) Date of Patent: Mar. 5, 2024

(54) SEMICONDUCTOR DEVICE AND METHOD OF MAKING

(71) Applicant: TAIWAN SEMICONDUCTOR MANUFACTURING COMPANY LIMITED, Hsin-Chu (TW)

(72) Inventors: Yi-Chen Chen, Jhubei (TW); Lee-Chuan Tseng, New Taipei (TW); Shih-Wei Lin, Taipei (TW)

(73) Assignee: TAIWAN SEMICONDUCTOR MANUFACTURING COMPANY LIMITED, Hsin-Chu (TW)

( * ) Notice: Subject to any disclaimer, the term of this patent is extended or adjusted under 35 U.S.C. 154(b) by 510 days.

(21) Appl. No.: 16/802,704

(22) Filed: Feb. 27, 2020

(65) Prior Publication Data

US 2021/0271024 A1    Sep. 2, 2021

(51) Int. Cl.
*G02B 6/132* (2006.01)
*G02B 6/12* (2006.01)

(52) U.S. Cl.
CPC .... *G02B 6/132* (2013.01); *G02B 2006/12121* (2013.01); *G02B 2006/12138* (2013.01); *G02B 2006/12142* (2013.01)

(58) Field of Classification Search
CPC .......... G02B 6/132; G02B 2006/12121; G02B 2006/12138; G02B 2006/12142; G02B 6/1228; G02B 6/136; G02B 6/305; G02B 6/12; G02B 6/13; G02B 6/131; G02B 2006/12061; G02B 2006/12083; G02B 6/1221; H01P 3/16
See application file for complete search history.

(56) References Cited

U.S. PATENT DOCUMENTS

| 9,946,029 B2 | 4/2018 | Shi et al. |
| 10,416,381 B1 | 9/2019 | Chen et al. |
| 11,256,114 B2 * | 2/2022 | Chen ........................ G02B 6/12 |
| 2003/0134445 A1 | 7/2003 | Kubby |
| 2005/0175287 A1 | 8/2005 | Pan et al. |
| 2012/0076465 A1 | 3/2012 | Chen et al. |

(Continued)

FOREIGN PATENT DOCUMENTS

| CN | 1967301 A | 5/2007 |
| CN | 101300668 A | 11/2008 |

(Continued)

OTHER PUBLICATIONS

Mustafa M. Aslan, et al., "Low-Loss Optical Waveguides for the Near Ultra-Violet and Visible Spectral Regions with Al2O3 Thin Films from Atomic Layer Deposition", Thin Solid Films, 2010, pp. 4935-4940, vol. 518.

(Continued)

*Primary Examiner* — John Bedtelyon
(74) *Attorney, Agent, or Firm* — COOPER LEGAL GROUP, LLC

(57) ABSTRACT

A semiconductor device is provided. The semiconductor device includes a waveguide over a substrate. The semiconductor device includes a first dielectric structure over the substrate, wherein a portion of the waveguide is in the first dielectric structure. The semiconductor device includes a second dielectric structure under the waveguide, wherein a first sidewall of the second dielectric structure is adjacent a first sidewall of the substrate.

20 Claims, 25 Drawing Sheets

(56) References Cited

U.S. PATENT DOCUMENTS

2016/0334572 A1    11/2016  Kraft et al.
2017/0285265 A1*  10/2017  Chen ...................... G02B 6/122

FOREIGN PATENT DOCUMENTS

| CN | 101369598 A | 2/2009 |
| --- | --- | --- |
| CN | 101620296 A | 1/2010 |
| CN | 102859406 A | 1/2013 |
| CN | 107329208 A | 11/2017 |
| CN | 109003935 A | 12/2018 |
| CN | 110168720 A | 8/2019 |
| JP | 1197854 A | 4/1999 |
| KR | 20010102102 A | 11/2001 |
| KR | 20160039150 A | 4/2016 |

OTHER PUBLICATIONS

Notice of Allowance for Corresponding Application No. 10-2020-0067674; dated Apr. 19, 2023; 8 Pages.

\* cited by examiner

SEMICONDUCTOR DEVICE AND METHOD OF MAKING

BACKGROUND

Semiconductor devices are used in a multitude of electronic devices, such as mobile phones, laptops, desktops, tablets, watches, gaming systems, and various other industrial, commercial, and consumer electronics. Semiconductor devices generally comprise semiconductor portions and wiring portions formed inside the semiconductor portions.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
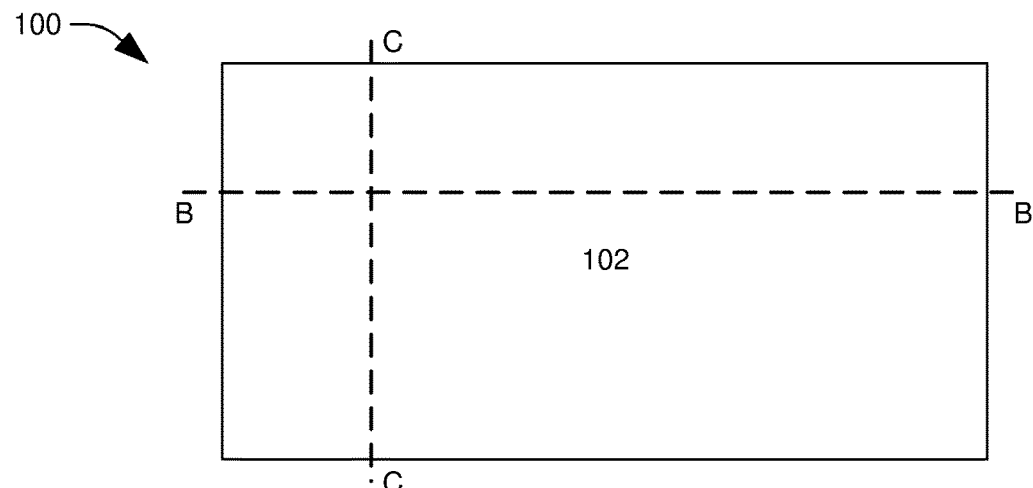
FIGS. 1A-1C illustrate a semiconductor device at a stage of fabrication, in accordance with some embodiments.

The following disclosure provides several different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation illustrated in the figures. The apparatus may be otherwise oriented (rotated 90 degrees or at other orientations) and the spatially relative descriptors used herein may likewise be interpreted accordingly.

Some embodiments relate to a semiconductor device. In accordance with some embodiments, the semiconductor device comprises a waveguide over a substrate and a first dielectric structure over the substrate, where a portion of the waveguide is in the first dielectric structure. The semiconductor device comprises a second dielectric structure under the waveguide. A first sidewall of the second dielectric structure is adjacent a first sidewall of a first portion of the substrate. A second sidewall of the second dielectric structure is adjacent a first sidewall of a second portion of the substrate. Other structures and configurations of the semiconductor device are within the scope of the present disclosure. The second portion of the substrate is removed such that a resulting void between the substrate and the first dielectric structure is defined at least in part by the second sidewall of the second dielectric structure. The second dielectric structure inhibits removal of the first portion of the substrate when the second portion of the substrate is removed.

In some embodiments, the semiconductor device comprises at least one of a communication device, such as a transceiver, a photonic device, such as a silicon-based photonic integrated circuit (IC), or a different type of device. The semiconductor device is configured for at least one of optical communication or propagation of an optical signal. Other structures and configurations of the semiconductor device are within the scope of the present disclosure. In some embodiments, the first dielectric structure is a coupler structure. The optical signal is transferred to a component, such as at least one of an optical fiber or a different component, via the first dielectric structure. The void between the substrate and the first dielectric structure inhibits leakage of the optical signal into the substrate. The second dielectric structure provides structural support for the first dielectric structure containing the waveguide to inhibit bending or sagging of the first dielectric structure in a direction toward the void, where such deflection causes a reduction in the optical signal being transferred from the waveguide to the component, such as due to misalignment between the waveguide and the component. The presence of the second dielectric structure serves to encourage, facilitate, enhance, etc. signal transfer, such as by governing an amount of the substrate removed so that the void is sufficiently sized so as to inhibit signal leakage but is not so large that the waveguide sags and thereby misaligns with the component.

Figure 6A:
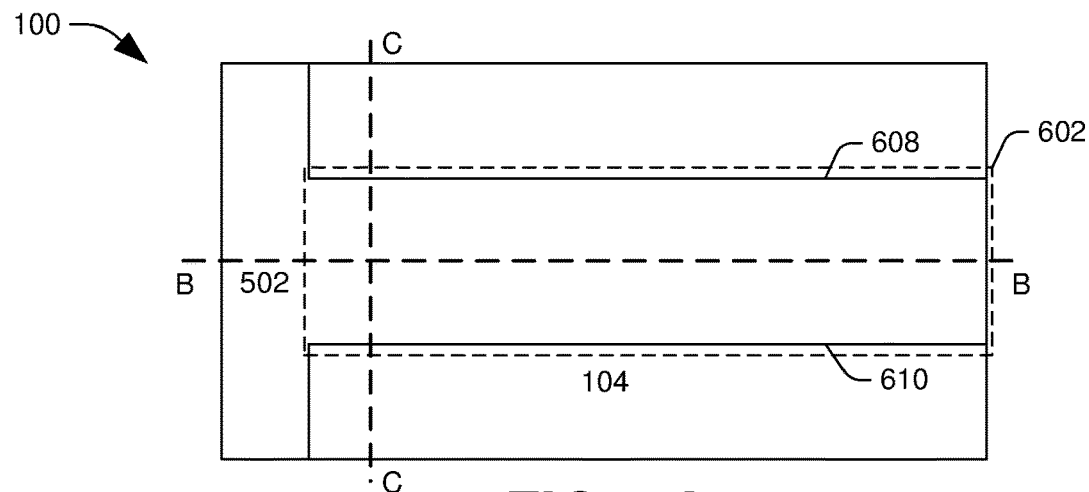
FIGS. 6A-6C illustrate a semiconductor device at a stage of fabrication, in accordance with some embodiments.
Figure 6B:
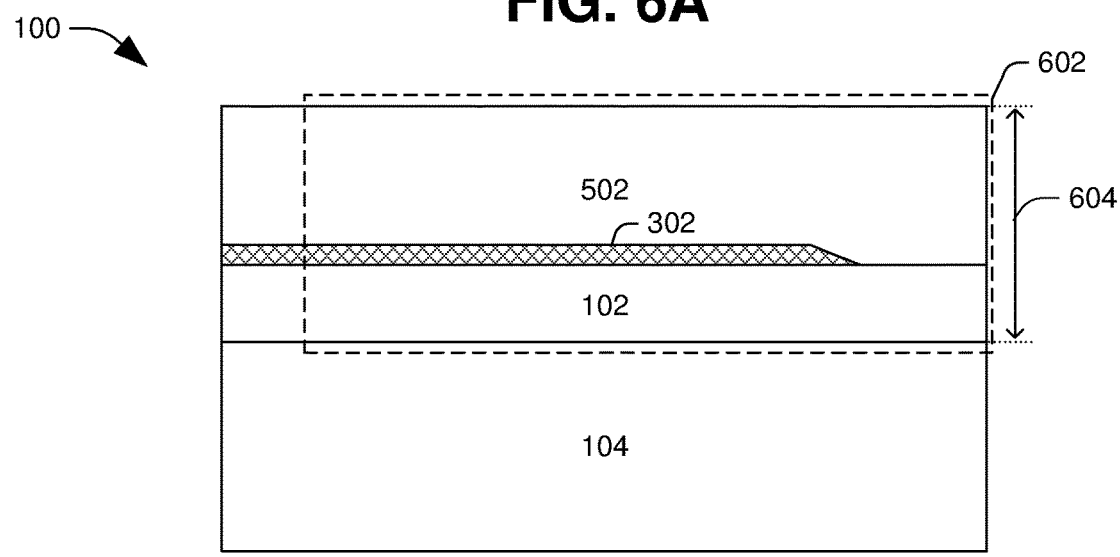
Figure 6C:
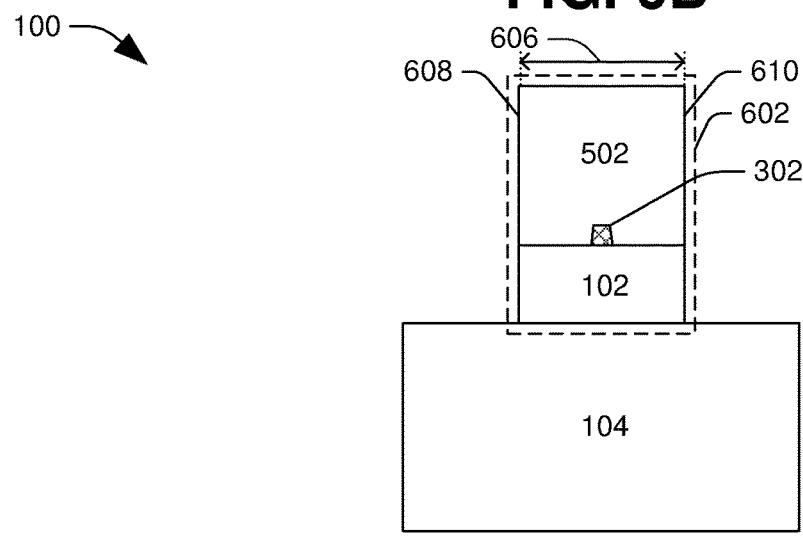
Figure 7A:
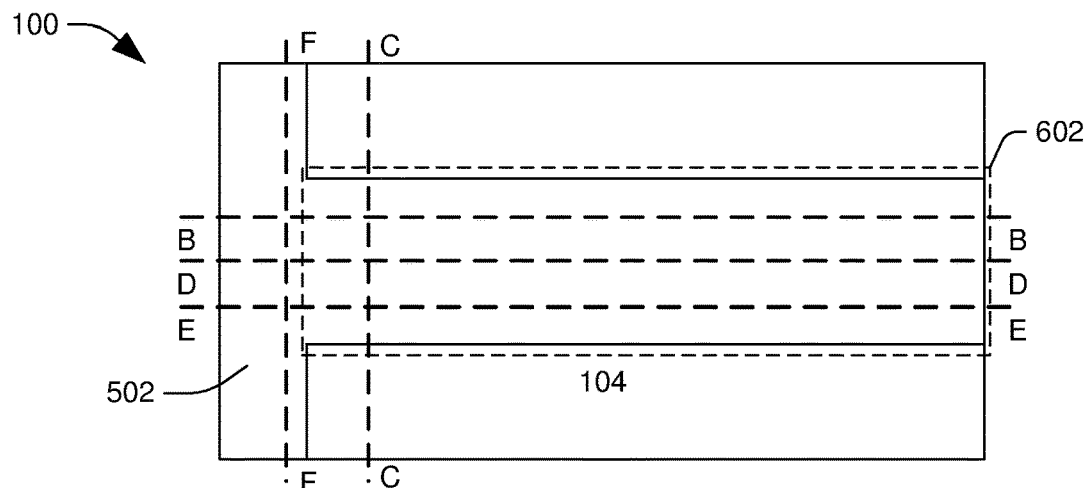
FIGS. 7A-7F illustrate a semiconductor device at a stage of fabrication, in accordance with some embodiments.
Figure 7B:
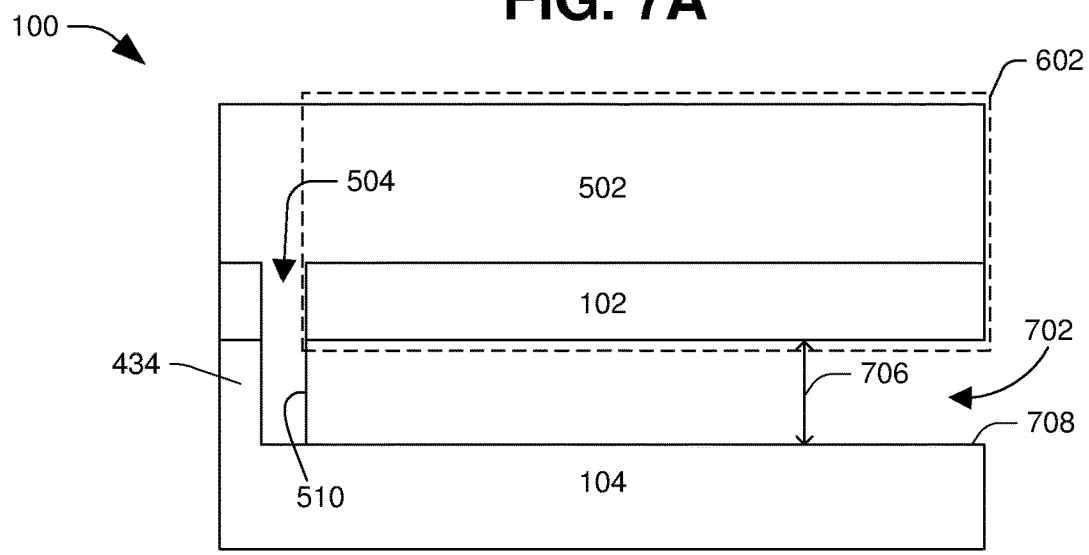
Figure 7C:
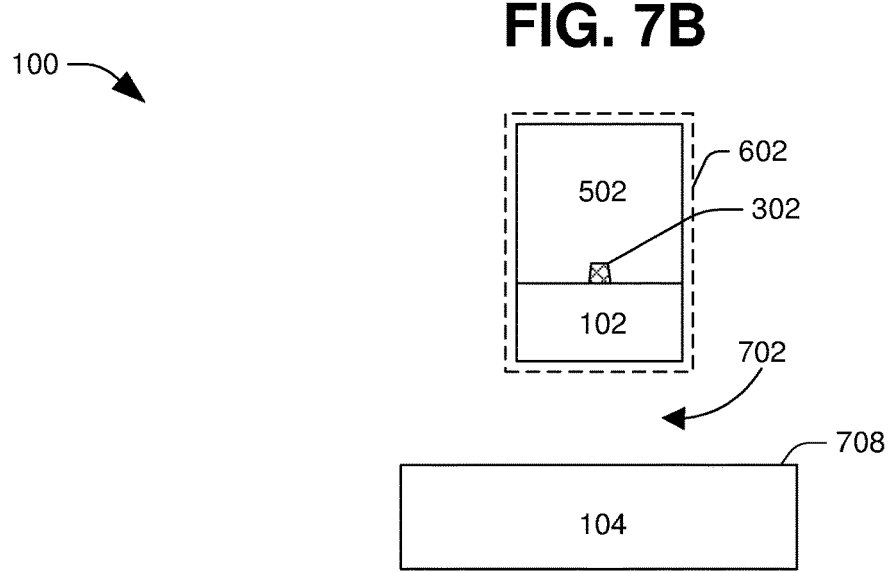
Figure 7D:
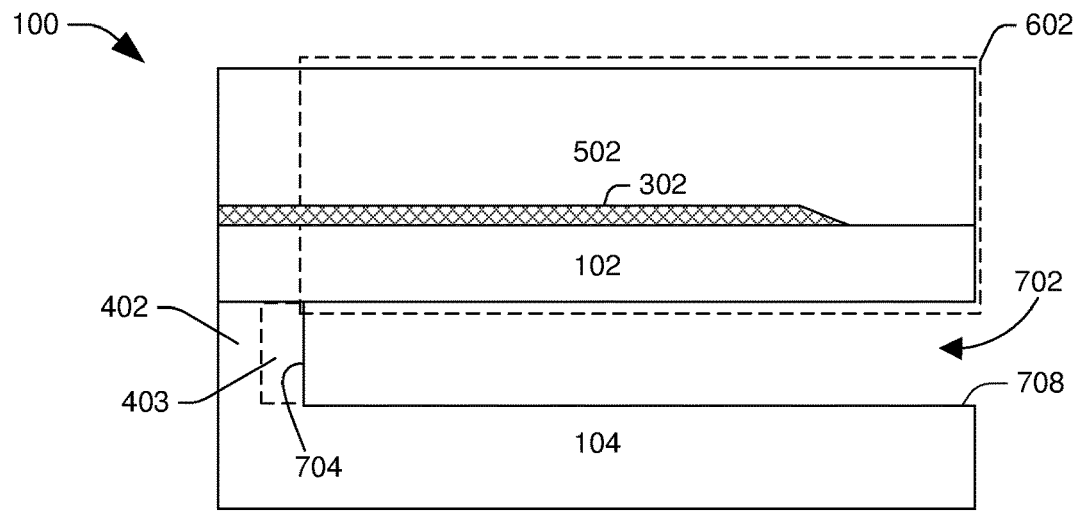
Figure 7E:
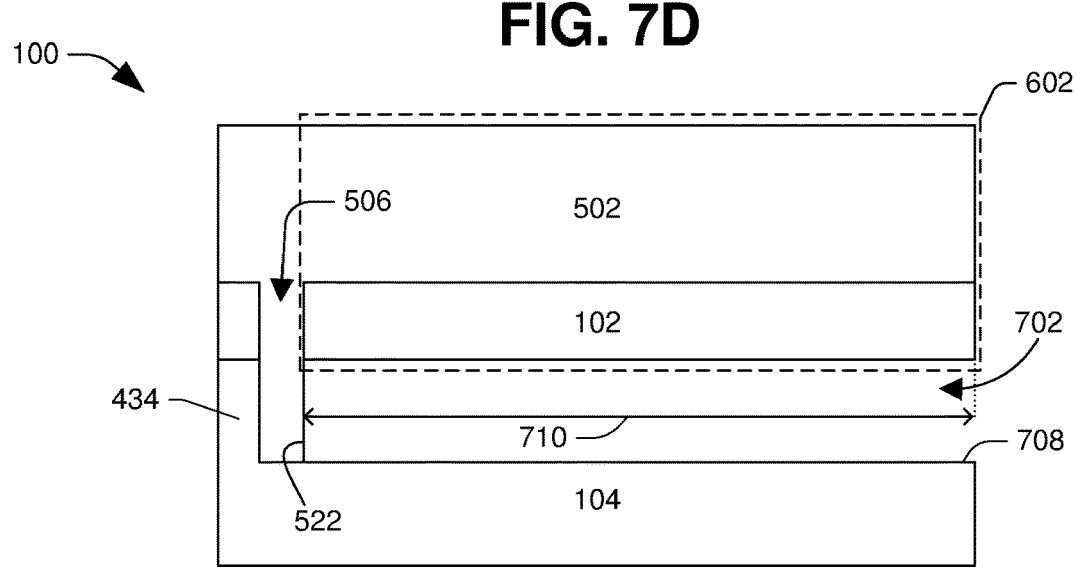
Figure 7F:
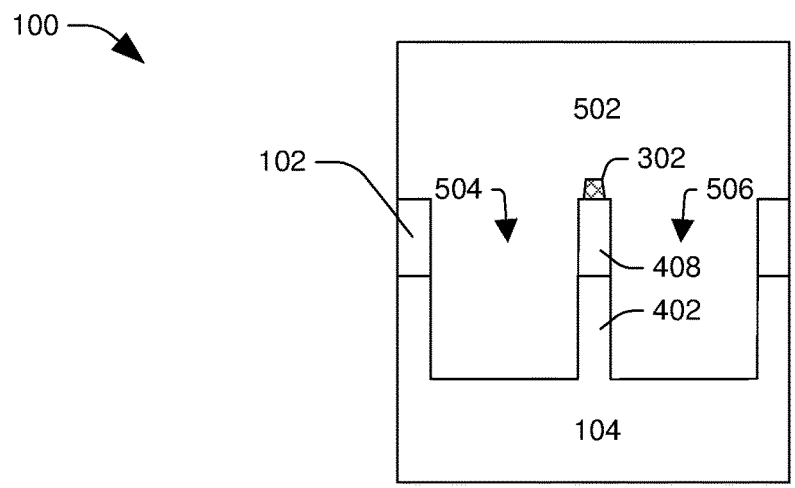
Figure 8A:
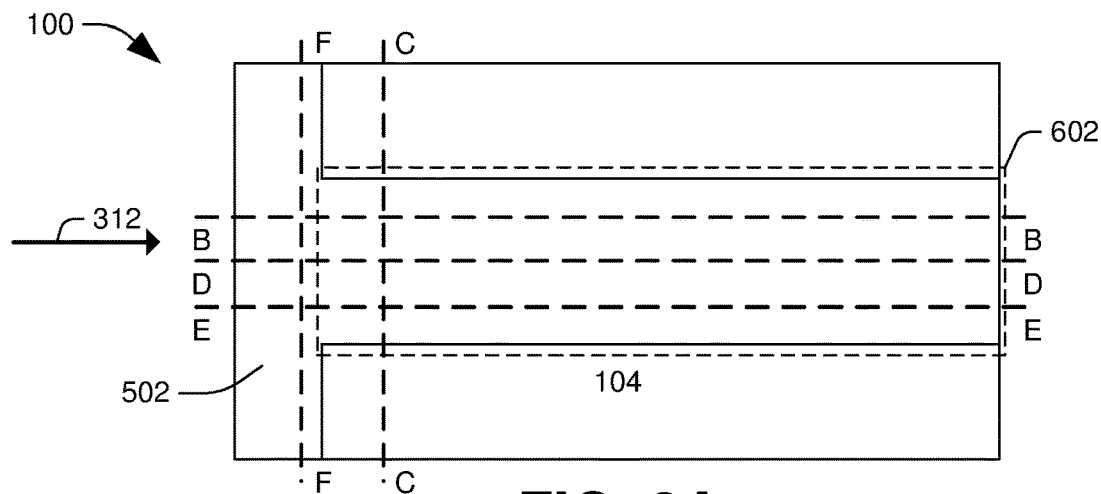
FIGS. 8A-8F illustrate a semiconductor device at a stage of fabrication, in accordance with some embodiments.
Figure 8B:
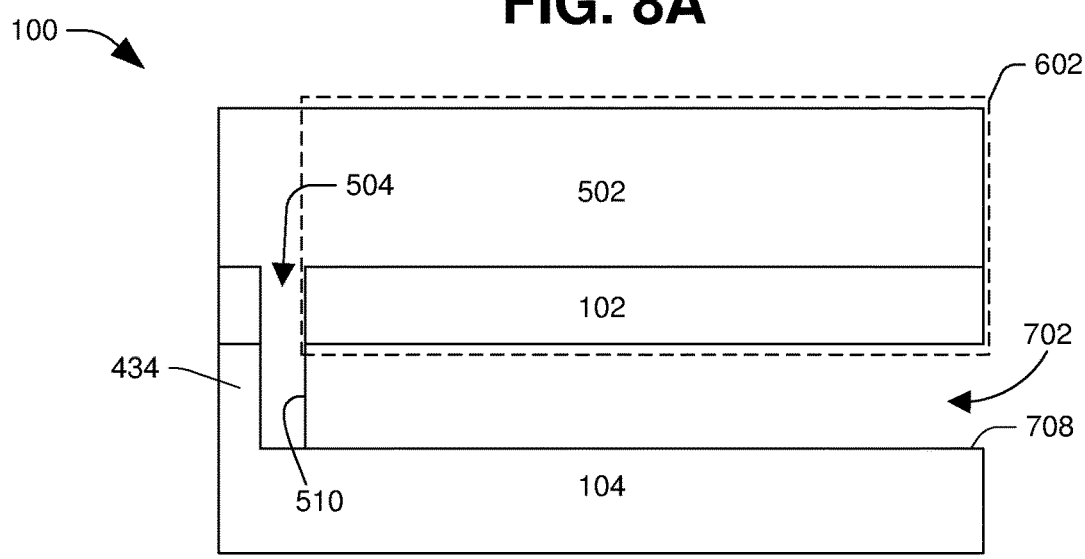
Figure 8C:
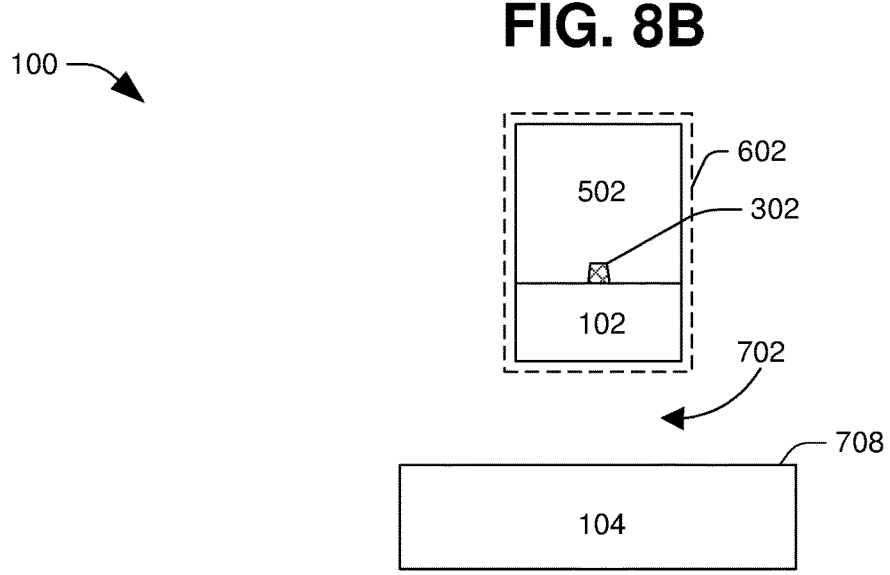
Figure 8D:
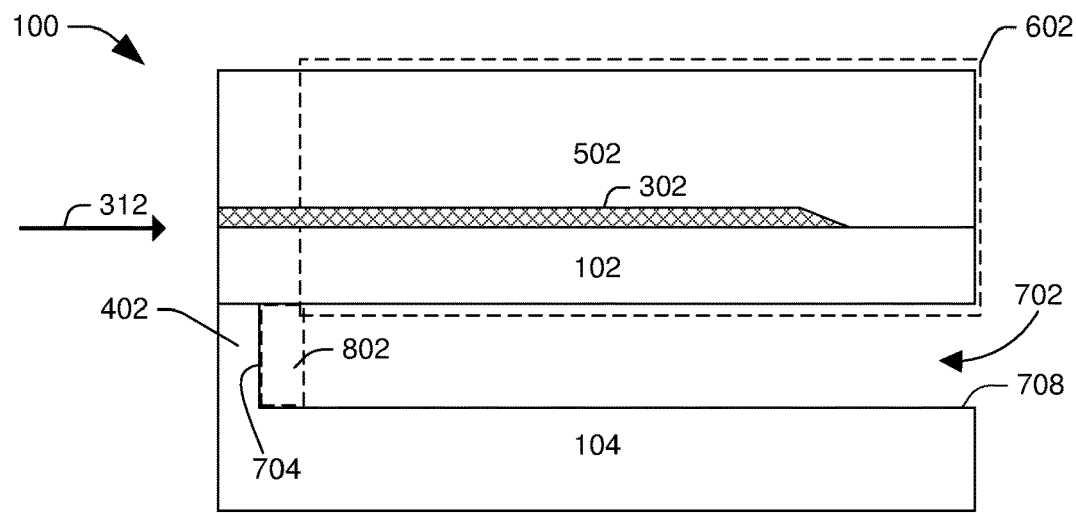
Figure 8E:
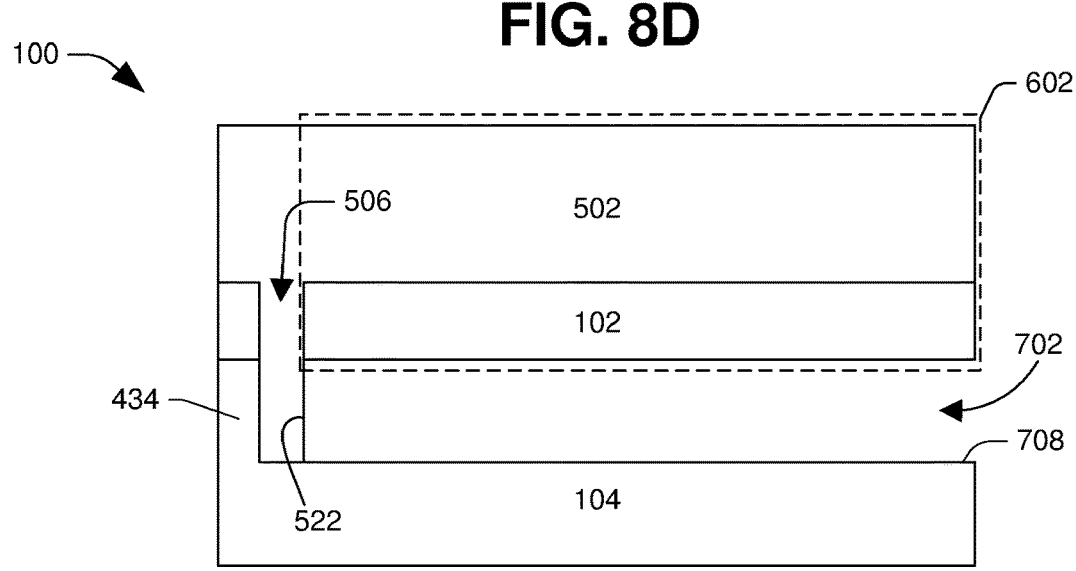
Figure 8F:
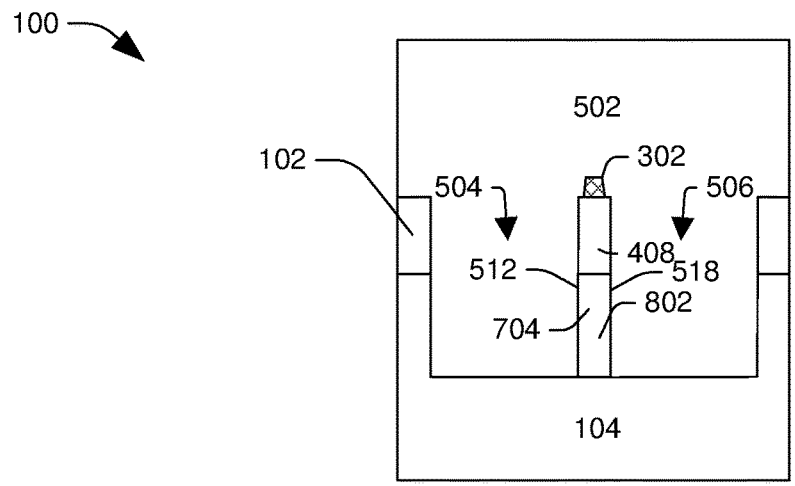

FIGS. 1A-8F illustrate a semiconductor device 100 at various stages of fabrication, in accordance with some embodiments. FIGS. 1A, 2A, 3A, 4A, 5A, 6A, 7A, and 8A illustrate top views of the semiconductor device 100 at various stages of fabrication. FIGS. 1B, 2B, 3B, 4B, 5B, 6B, 7B, and 8B illustrate cross-sectional views of the semiconductor device 100 taken along lines B-B of FIGS. 1A, 2A, 3A, 4A, 5A, 6A, 7A, and 8A, respectively. FIGS. 1C, 2C, 3C, 4C, 5C, 6C, 7C, and 8C illustrate cross-sectional views of the semiconductor device 100 taken along lines C-C of FIGS. 1A, 2A, 3A, 4A, 5A, 6A, 7A, and 8A, respectively. FIGS. 4D, 5D, 7D, and 8D illustrate cross-sectional views of the semiconductor device 100 taken along lines D-D of FIGS. 4A, 5A, 7A, and 8A, respectively. FIGS. 5E, 7E, and 8E illustrate cross-sectional views of the semiconductor device 100 taken along lines E-E of FIGS. 5A, 7A, and 8A, respectively. FIGS. 7F and 8F illustrate cross-sectional views of the semiconductor device 100 taken along lines F-F of FIGS. 7A and 8A, respectively. The views illustrated in FIGS. 1C, 2C, 3C, 4C, 5C, 6C, 7C, and 8C are 90-degrees relative to the views illustrated in FIGS. 1B, 2B, 3B, 4B, 5B, 6B, 7B, and 8B, respectively. The views illustrated in FIGS. 4C, 5C, 7C, and 8C are 90-degrees relative to the views illustrated in FIGS. 4D, 5D, 7D, and 8D, respectively. The views illustrated in FIGS. 5C, 7C, and 8C are 90-degrees relative to the views illustrated in FIGS. 5E, 7E, and 8E, respectively. The views illustrated in FIGS. 7F and 8F are 90-degrees relative to the views illustrated in FIGS. 7B and 8B, respectively.

In some embodiments, the semiconductor device 100 comprises at least one of a communication device, such as a transceiver, a photonic device, such as a silicon-based photonic IC, or a different type of device. The semiconductor device 100 is configured for at least one of optical communication or propagation of an optical signal. Other structures and configurations of the semiconductor device 100 are within the scope of the present disclosure.

Figure 1B:
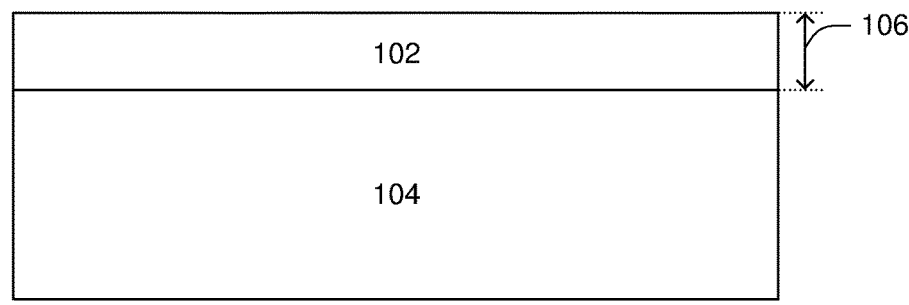
Figure 1C:
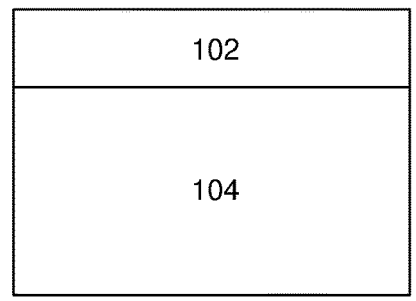

FIGS. 1A, 1B, and 1C illustrate the semiconductor device 100 according to some embodiments. In some embodiments, the semiconductor device 100 comprises a first dielectric layer 102 and a substrate 104. The substrate 104 comprises at least one of an epitaxial layer, a silicon-on-insulator (SOI) structure, a wafer, or a die formed from a wafer. Other structures and configurations of the substrate 104 are within the scope of the present disclosure. The substrate 104 comprises at least one of silicon, germanium, carbide, arsenide, gallium, arsenic, phosphide, indium, antimonide, SiGe, SiC, GaAs, GaN, GaP, InGaP, InP, InAs, InSb, GaAsP, AlInAs, AlGaAs, GaInAs, GaInP, GaInAsP, or other suitable material. According to some embodiments, the substrate 104 comprises monocrystalline silicon, crystalline silicon with a <100> crystallographic orientation, crystalline silicon with a <110> crystallographic orientation or other suitable material. In some embodiments, the substrate 104 comprises at least one doped region.

In some embodiments, the first dielectric layer 102 is formed over the substrate 104. The first dielectric layer 102 at least one of overlies the substrate 104, is in direct contact with a top surface of the substrate 104, or is in indirect contact with the top surface of the substrate 104. In some embodiments, one or more layers, such as a buffer layer, are between the first dielectric layer 102 and the substrate 104.

In some embodiments, the first dielectric layer 102 comprises at least one of silicon, nitride, oxide, such as $SiO_2$, or other suitable material. In some embodiments, the first dielectric layer 102 is a bottom oxide (BOX). Other structures and configurations of the first dielectric layer 102 are within the scope of the present disclosure. The first dielectric layer 102 is formed by at least one of physical vapor deposition (PVD), sputtering, chemical vapor deposition (CVD), low pressure CVD (LPCVD), atomic layer chemical vapor deposition (ALCVD), ultrahigh vacuum CVD (UHVCVD), reduced pressure CVD (RPCVD), atomic layer deposition (ALD), molecular beam epitaxy (MBE), liquid phase epitaxy (LPE), spin on, growth, or other suitable techniques. In some embodiments, the first dielectric layer 102 has a thickness 106 between about 10,000 angstroms and about 30,000 angstroms. Other values of the thickness 106 are within the scope of the present disclosure.

Figure 2A:
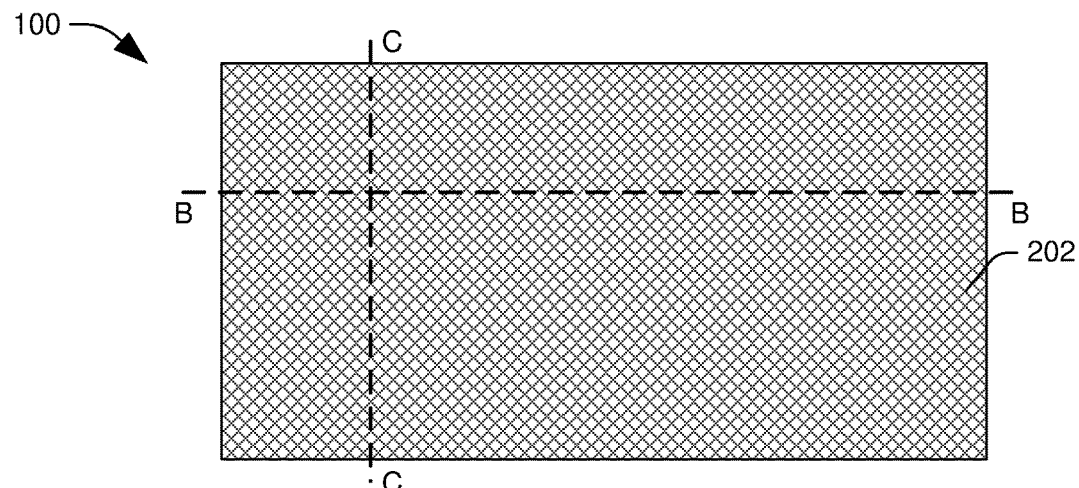
FIGS. 2A-2C illustrate a semiconductor device at a stage of fabrication, in accordance with some embodiments.
Figure 2B:
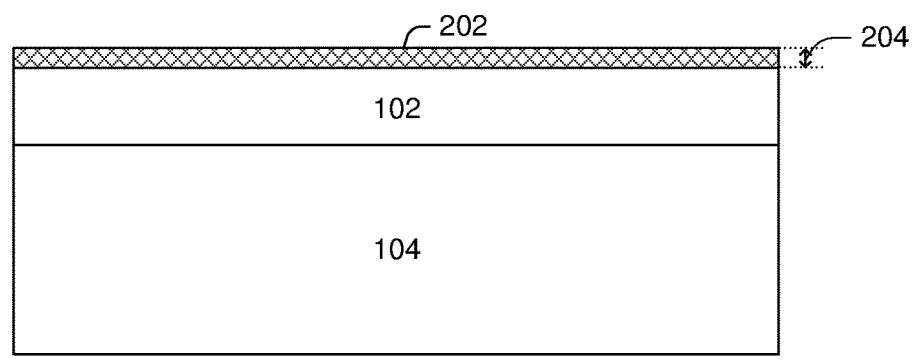
Figure 2C:
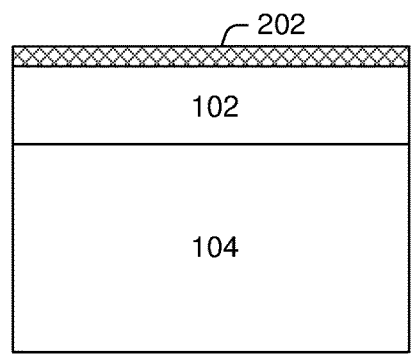

FIGS. 2A, 2B, and 2C illustrate a semiconductor layer 202 formed over the first dielectric layer 102, according to some embodiments. The semiconductor layer 202 at least one of overlies the first dielectric layer 102, is in direct contact with a top surface of the first dielectric layer 102, or is in indirect contact with the top surface of the first dielectric layer 102. In some embodiments, one or more layers, such as a buffer layer, are between the semiconductor layer 202 and the first dielectric layer 102. The semiconductor layer 202 comprises at least one of a semiconductor material or other suitable material. According to some embodiments, the semiconductor layer 202 comprises silicon, such as monocrystalline silicon, crystalline silicon with a <100> crystallographic orientation, crystalline silicon with a <110> crystallographic orientation or other suitable material. Other structures and configurations of the semiconductor layer 202 are within the scope of the present disclosure. In some embodiments, the semiconductor layer 202 has a thickness 204 between about 2,000 angstroms and about 4,000 angstroms. Other values of the thickness 204 are within the scope of the present disclosure.

Figure 3A:
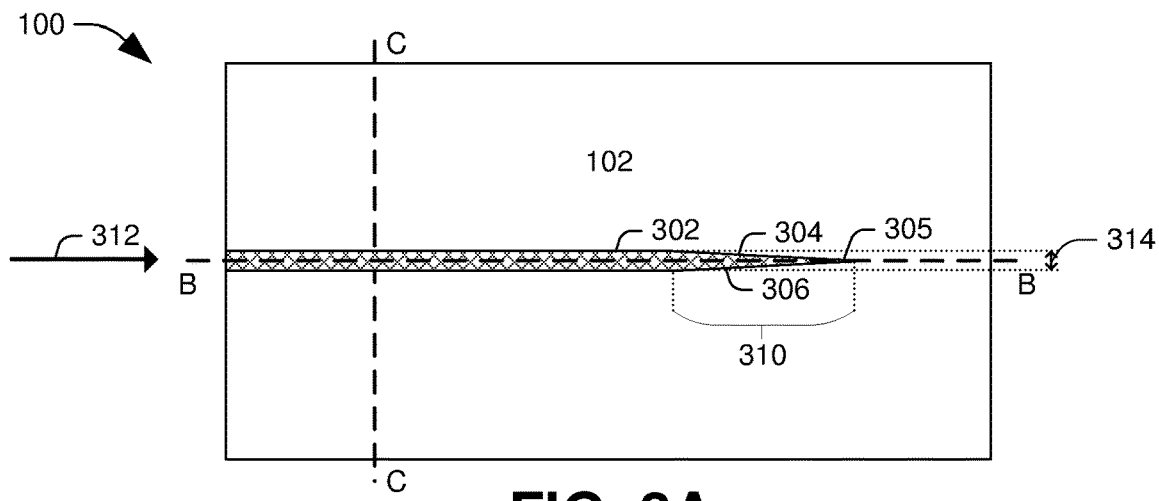
FIGS. 3A-3C illustrate a semiconductor device at a stage of fabrication, in accordance with some embodiments.
Figure 3B:
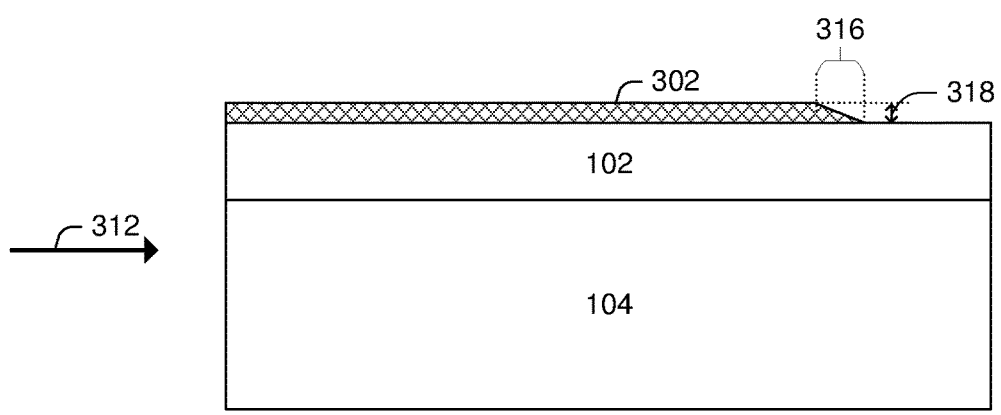
Figure 3C:
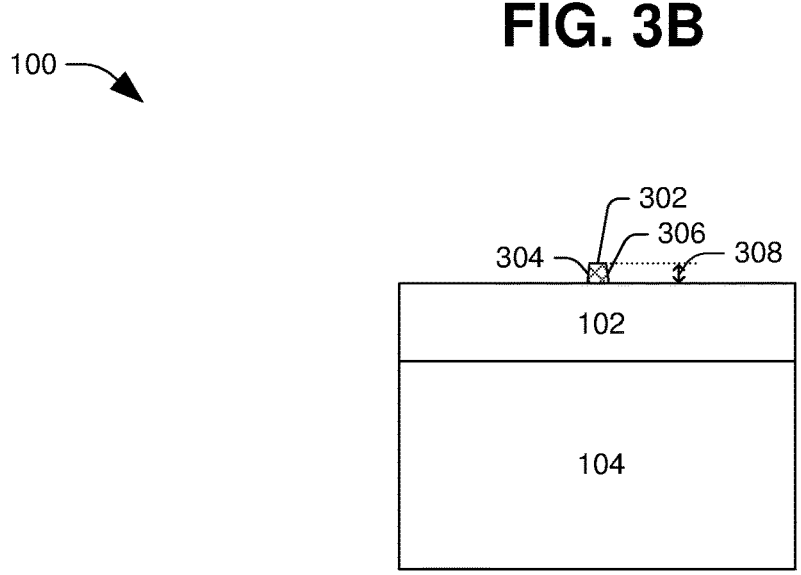

FIGS. 3A, 3B, and 3C illustrate a waveguide 302 formed over the first dielectric layer 102, according to some embodiments. In some embodiments, the semiconductor layer 202 is patterned to form the waveguide 302, such as using a photoresist (not shown). In some embodiments, the semiconductor layer 202 is treated, such as having features, elements, etc. selectively formed therein, having dopants selectively implanted therein, etc., at least one of before or after being patterned. The photoresist is formed over the semiconductor layer 202. The photoresist is formed by at least one of PVD, sputtering, CVD, LPCVD, ALCVD, UHVCVD, RPCVD, ALD, MBE, LPE, spin on, growth, or other suitable techniques. The photoresist comprises a light-sensitive material, where properties, such as solubility, of the photoresist are affected by light. The photoresist is a negative photoresist or a positive photoresist. With respect to a negative photoresist, regions of the negative photoresist become insoluble when illuminated by a light source, such that application of a solvent to the negative photoresist during a subsequent development stage removes non-illuminated regions of the negative photoresist. A pattern formed in the negative photoresist is thus a negative image of a pattern defined by opaque regions of a template, such as a mask, between the light source and the negative photoresist. In a positive photoresist, illuminated regions of the positive photoresist become soluble and are removed via application of a solvent during development. Thus, a pattern formed in the positive photoresist is a positive image of opaque regions of the template, such as a mask, between the light source and the positive photoresist. One or more etchants have a selectivity such that the one or more etchants remove or etch away one or more layers exposed or not covered by the photoresist at a greater rate than the one or more etchants remove or etch away the photoresist. In some embodiments, the one or more layers comprise the semiconductor layer 202. An opening in the photoresist allows the one or more etchants to form a corresponding opening in the one or more layers under the photoresist, and thereby transfer a pattern in the photoresist to the one or more layers under the photoresist. The photoresist is removed after the pattern transfer, such as by at least one of chemical mechanical planarization (CMP), etching, or other suitable techniques. According to some embodiments, the photoresist is at least one of stripped or washed away using at least one of hydrogen fluoride (HF), diluted HF, a chlorine compound such as hydrogen chloride (HCl), hydrogen sulfide ($H_2S$), or other suitable material. Other processes and techniques for at least one of patterning the semiconductor layer 202 or forming the waveguide 302 are within the scope of the present disclosure.

An etching process used to remove portions of the semiconductor layer 202 to expose portions of the first dielectric layer 102 and form the waveguide 302 is at least one of a dry etching process, a wet etching process, an anisotropic etching process, an isotropic etching process, or another suitable process. The etching process uses at least one of HF, diluted HF, a chlorine compound such as $HCl_2$, $H_2S$, or other suitable material. Other processes and techniques for at least one of removing portions of the semiconductor layer 202 to expose portions of the first dielectric layer 102 or forming the waveguide 302 are within the scope of the present disclosure.

In some embodiments, the waveguide 302 has a thickness 308 (shown in FIG. 3C) between about 2,000 angstroms and about 4,000 angstroms. Other values of the thickness 308 are within the scope of the present disclosure. In some embodiments, the waveguide 302 has at least one of a first tapered sidewall 304 or a second tapered sidewall 306. The first tapered sidewall 304 of the waveguide 302 has a first slope. The second tapered sidewall 306 of the waveguide 302 has a second slope. In some embodiments, the first slope is opposite in polarity relative to the second slope.

At least a portion of the waveguide 302 extends in a direction 312. In some embodiments, at least one of a cross-sectional area of the waveguide 302 decreases along the direction 312 or a cross-sectional area of a first portion 310 of the waveguide 302 decreases along the direction 312. The first portion 310 of the waveguide 302 comprises an end point 305 of the waveguide 302, where the waveguide 302 does not extend in the direction 312 past the end point.

According to some embodiments, the first portion 310 of the waveguide 302 is formed having sidewalls according to a knife-edge taper. In some embodiments, at least one of a width 314 (shown in FIG. 3A) of the first portion 310 of the waveguide 302 decreases along the direction 312 or a height 318 (shown in FIG. 3B) of a second portion 316 of the waveguide 302 decreases along the direction 312. The second portion 316 of the waveguide 302 at least one of is part of the first portion 310 of the waveguide 302 or corresponds to the first portion 310 of the waveguide 302. Other values and configurations of at least one of the first portion 310, the second portion 316, the width 314, or the height 318 are within the scope of the present disclosure.

FIGS. 4A, 4B, 4C, and 4D illustrate a first trench 404 and a second trench 406 formed in the first dielectric layer 102 and the substrate 104, according to some embodiments. In some embodiments, at least one of the first trench 404 exposes a portion of the substrate 104 or the second trench 406 exposes a portion of the substrate 104. At least one of a portion of the first dielectric layer 102 and a portion of the substrate 104 are removed to form the first trench 404 or a portion of the first dielectric layer 102 and a portion of the substrate 104 are removed to form the second trench 406. A first portion 434 of the substrate 104 (shown in FIGS. 4B and 4D) is adjacent a first side of the first trench 404 and a first side of the second trench 406. A second portion 436 of the substrate 104 (shown in FIGS. 4B and 4D) is adjacent a second side of the first trench 404 and a second side of the second trench 406.

In some embodiments, the first trench 404 and the second trench 406 are offset from the waveguide 302 in a direction perpendicular to the direction 312. In some embodiments, a third portion 402 of the substrate 104 is between the first trench 404 and the second trench 406, where the waveguide 302 overlies the third portion 402 of the substrate 104. In some embodiments, a first portion 408 of the first dielectric layer 102 is between the first trench 404 and the second trench 406, where the first portion 408 of the first dielectric layer 102 overlies the third portion 402 of the substrate 104. The waveguide 302 overlies the third portion 402 of the substrate 104 and the first portion 408 of the first dielectric layer 102.

Figure 4A:
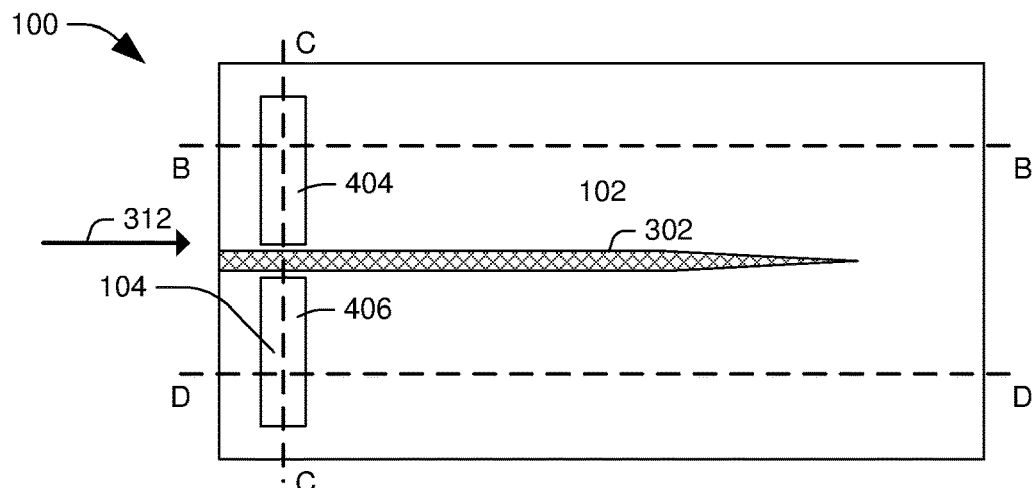
FIGS. 4A-4D illustrate a semiconductor device at a stage of fabrication, in accordance with some embodiments.
Figure 4B:
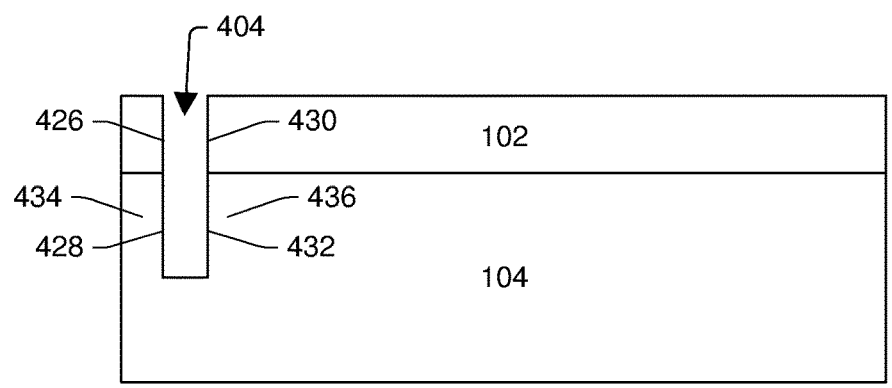
Figure 4C:
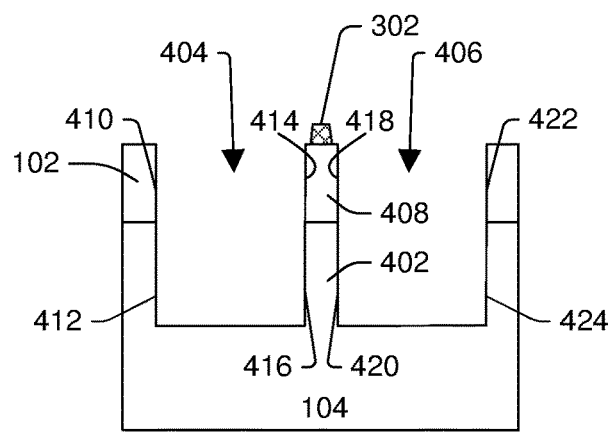

The first trench 404 is defined by at least one of a first sidewall 414 of the first portion 408 of the first dielectric layer 102 (shown in FIG. 4C), a first sidewall 416 of the third portion 402 of the substrate 104 (shown in FIG. 4C), a sidewall 410 of the first dielectric layer 102 (shown in FIG. 4C), a sidewall 412 of the substrate 104 (shown in FIG. 4C), a sidewall 426 of the first dielectric layer 102 (shown in FIG. 4B), a sidewall 430 of the first dielectric layer 102 (shown in FIG. 4B), a first sidewall 428 of the first portion 434 of the substrate 104 (shown in FIG. 4B), or a first sidewall 432 of the second portion 436 of the substrate 104 (shown in FIG. 4B). Other structures and configurations of the first trench 404 are within the scope of the present disclosure.

Figure 4D:
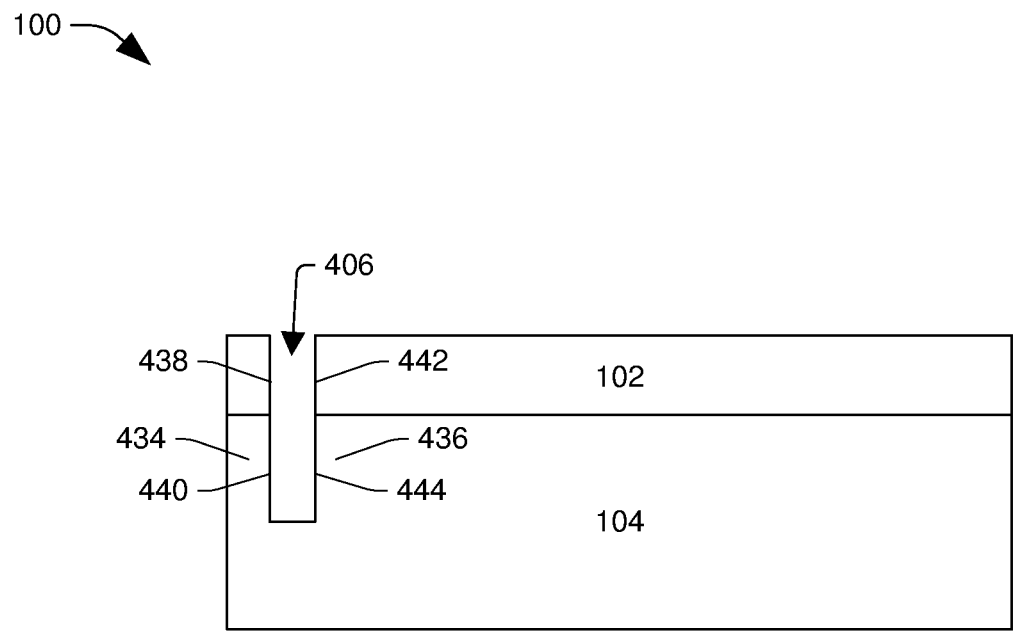
Figure 5A:
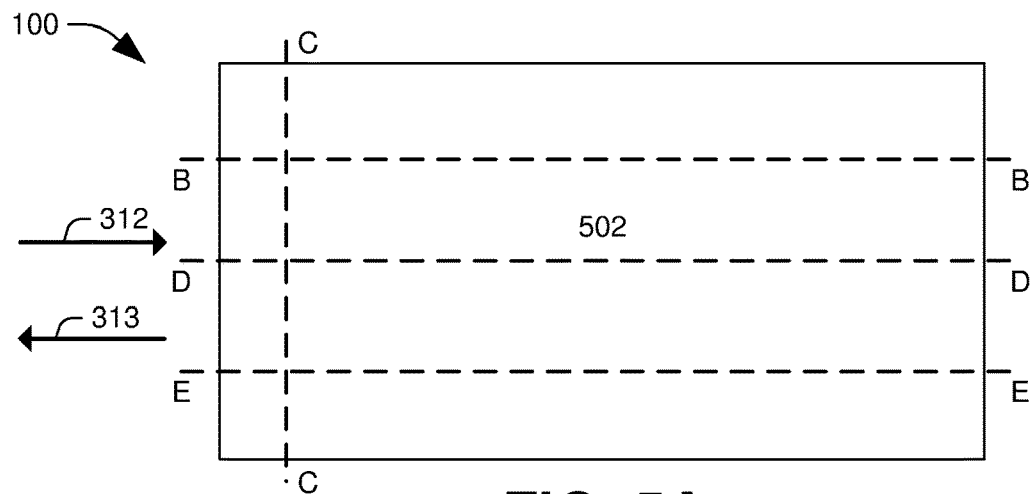
FIGS. 5A-5E illustrate a semiconductor device at a stage of fabrication, in accordance with some embodiments.
Figure 5B:
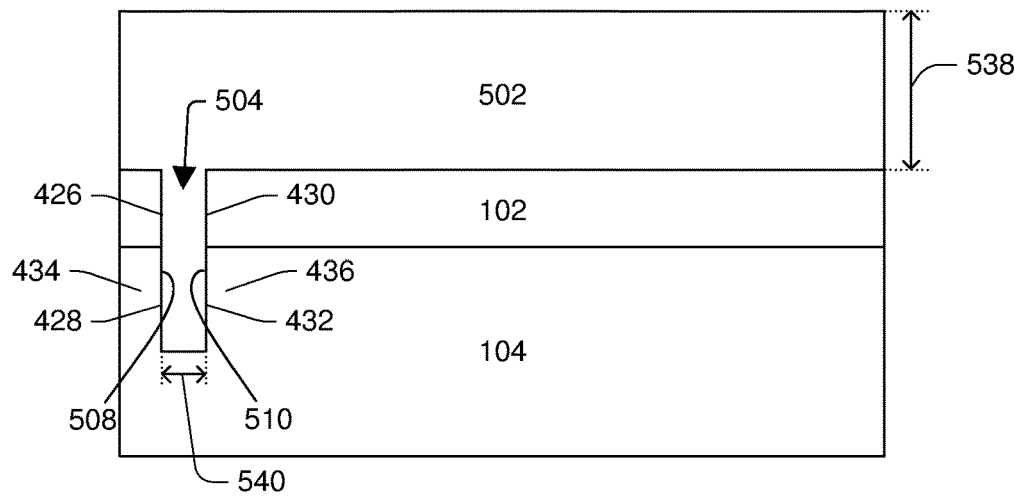
Figure 5C:
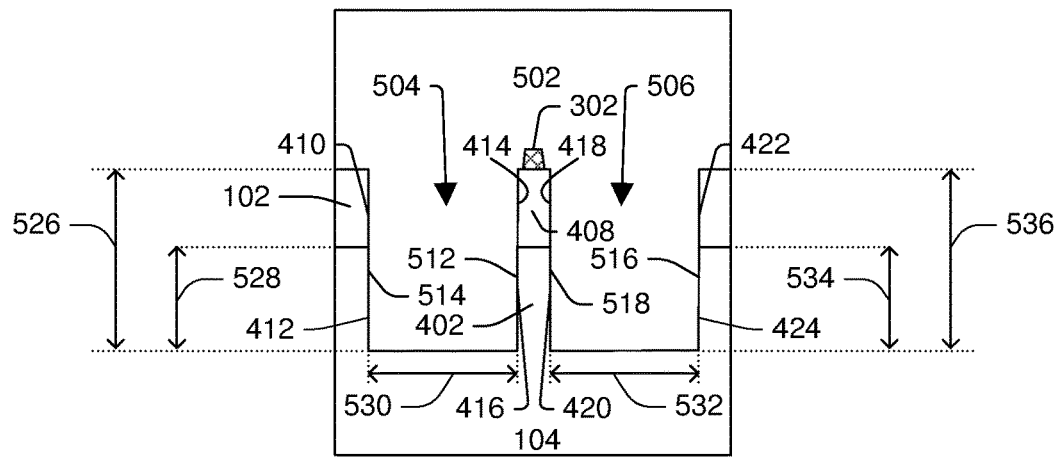
Figure 5D:
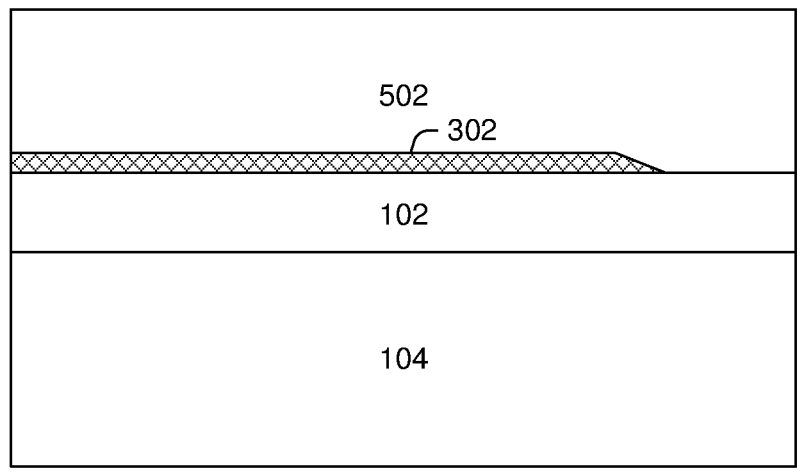
Figure 5E:
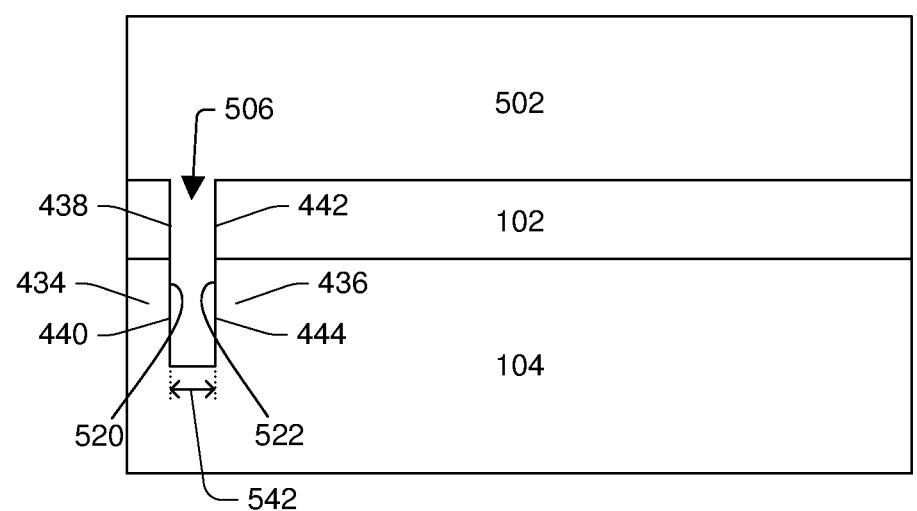

The second trench 406 is defined by at least one of a second sidewall 418 of the first portion 408 of the first dielectric layer 102 (shown in FIG. 4C), a second sidewall 420 of the third portion 402 of the substrate 104 (shown in FIG. 4C), a sidewall 422 of the first dielectric layer 102 (shown in FIG. 4C), a sidewall 424 of the substrate 104 (shown in FIG. 4C), a sidewall 438 of the first dielectric layer 102 (shown in FIG. 4D), a sidewall 442 of the first dielectric layer 102 (shown in FIG. 4D), a second sidewall 440 of the first portion 434 of the substrate 104 (shown in FIG. 4D), or a second sidewall 444 of the second portion 436 of the substrate 104 (shown in FIG. 4D). Other structures and configurations of the second trench 406 are within the scope of the present disclosure.

In some embodiments, the first dielectric layer 102 and the substrate 104 are patterned to form the first trench 404 and the second trench 406, such as using a photoresist (not shown). The photoresist is formed over the first dielectric layer 102. The photoresist is formed by at least one of PVD, sputtering, CVD, LPCVD, ALCVD, UHVCVD, RPCVD, ALD, MBE, LPE, spin on, growth, or other suitable techniques. The photoresist comprises a light-sensitive material, where properties, such as solubility, of the photoresist are affected by light. The photoresist is a negative photoresist or a positive photoresist.

One or more etchants have a selectivity such that the one or more etchants remove or etch away one or more layers exposed or not covered by the photoresist at a greater rate than the one or more etchants remove or etch away the photoresist. In some embodiments, the one or more layers comprise the first dielectric layer 102 and the substrate 104. An opening in the photoresist allows the one or more etchants to form a corresponding opening, such as at least one of the first trench 404 or the second trench 406, in the one or more layers under the photoresist, and thereby transfer a pattern in the photoresist to the one or more layers under the photoresist. The photoresist is removed after the pattern transfer, such as by at least one of CMP, etching, or other suitable techniques. According to some embodiments, the photoresist is at least one of stripped or washed away using at least one of HF, diluted HF, a chlorine compound such as $HCl_2$, $H_2S$, or other suitable material. Other processes and techniques for at least one of patterning the first dielectric layer 102 and the substrate 104 or forming the first trench 404 and the second trench 406 are within the scope of the present disclosure.

An etching process used to form the first trench 404 and the second trench 406 is at least one of a dry etching process, a wet etching process, an anisotropic etching process, an isotropic etching process, or another suitable process. The etching process uses at least one of HF, diluted HF, a chlorine compound such as $HCl_2$, $H_2S$, or other suitable material. Other processes and techniques for forming at least one of the first trench 404 or the second trench 406 are within the scope of the present disclosure.

According to some embodiments, the first trench and the second trench are formed using a mask layer (not shown), where the mask layer is formed over the first dielectric layer 102. In some embodiments, the mask layer is a hard mask layer. The mask layer comprises at least one of oxide, nitride, a metal, or other suitable material. The mask layer is formed by at least one of PVD, sputtering, CVD, LPCVD, ALCVD, UHVCVD, RPCVD, ALD, MBE, LPE, spin on, growth, or other suitable techniques. According to some embodiments, the mask layer is patterned to form a patterned mask layer (not shown), such as using a photoresist (not shown). In some embodiments, the photoresist is removed after the patterned mask layer is formed, such as by at least one of CMP, etching, or other suitable techniques. According to some embodiments, the photoresist is at least one of stripped or washed away using at least one of HF, diluted HF, a chlorine compound such as $HCl_2$, $H_2S$, or other suitable material.

An etching process used to remove portions of the mask layer to expose portions of the first dielectric layer 102 and form the patterned mask layer is at least one of a dry etching process, a wet etching process, an anisotropic etching process, an isotropic etching process, or another suitable process. The etching process uses at least one of HF, diluted HF, a chlorine compound such as $HCl_2$, $H_2S$, or other suitable material.

In some embodiments, an etching process is performed to form the first trench 404 and the second trench 406, where openings in the patterned mask layer allow one or more etchants applied during the etching process to remove portions of the first dielectric layer 102 and the substrate 104 while the patterned mask layer protects or shields portions of the first dielectric layer 102 that are covered by the patterned mask layer. The etching process is at least one of a dry etching process, a wet etching process, an anisotropic etching process, an isotropic etching process, or another suitable process. The etching process uses at least one of HF, diluted HF, a chlorine compound such as $HCl_2$, $H_2S$, or other suitable material. In some embodiments, the patterned mask layer is removed after the first trench 404 and the second trench 406 are formed, such as by at least one of CMP, etching, or other suitable techniques. Other processes and techniques for forming at least one of the first trench 404 or the second trench 406 are within the scope of the present disclosure.

FIGS. 5A, 5B, 5C, 5D, and 5E illustrate a second dielectric layer 502 formed over the first dielectric layer 102, according to some embodiments. In some embodiments, the second dielectric layer 502 overlies the first dielectric layer 102 and the substrate 104. The second dielectric layer 502 comprises at least one of silicon, nitride, oxide, such as $SiO_2$, or other suitable material. The second dielectric layer 502 is formed by at least one of PVD, sputtering, CVD, LPCVD, ALCVD, UHVCVD, RPCVD, ALD, MBE, LPE, spin on, growth, or other suitable techniques. In some embodiments, the second dielectric layer 502 has a thickness 538 between about 20,000 angstroms and about 60,000 angstroms. Other values of the thickness 538 are within the scope of the present disclosure.

In some embodiments, the second dielectric layer 502 is in direct contact with a top surface of the first dielectric layer 102. The second dielectric layer 502 is different than the first dielectric layer 102, such as having a different material composition, such that an interface is defined between the second dielectric layer 502 and the first dielectric layer 102. In some embodiments, the second dielectric layer 502 does not have a material composition different than the first dielectric layer 102. An interface is nevertheless defined between the second dielectric layer 502 and the first dielectric layer 102 because the second dielectric layer 502 and the first dielectric layer 102 are separate, different, etc. layers. In some embodiments, the second dielectric layer 502 is in indirect contact with the top surface of the first dielectric layer 102, where one or more layers, such as a buffer layer, are between the second dielectric layer 502 and the first dielectric layer 102.

The second dielectric layer 502 at least one of overlies the waveguide 302, is in direct contact with at least one of a sidewall or a top surface of the waveguide 302, or is in indirect contact with the top surface of the waveguide 302. In some embodiments, one or more layers, such as a buffer layer, are between the second dielectric layer 502 and the waveguide 302.

A first dielectric structure 504 is formed in the first trench 404, such as by filling the first trench 404 with a first dielectric material to form the first dielectric structure 504. In some embodiments, the second dielectric layer 502 is formed in the first trench 404 to form the first dielectric structure 504. The first dielectric structure 504 is at least one of a portion of the second dielectric layer 502 in the first trench 404 or a portion of the second dielectric layer 502 that fills the first trench 404.

A first sidewall 508 of the first dielectric structure 504 (shown in FIG. 5B) is adjacent at least one of the first sidewall 428 of the first portion 434 of the substrate 104 or the sidewall 426 of the first dielectric layer 102. The first sidewall 508 of the first dielectric structure 504 at least one of aligns with, is in direct contact with, or is in indirect contact with at least one of the first sidewall 428 of the first portion 434 of the substrate 104 or the sidewall 426 of the first dielectric layer 102. In some embodiments, one or more layers, such as a buffer layer, are between the first sidewall 508 of the first dielectric structure 504 and at least one of the first sidewall 428 of the first portion 434 of the substrate 104 or the sidewall 426 of the first dielectric layer 102.

A second sidewall 510 of the first dielectric structure 504 (shown in FIG. 5B) is adjacent at least one of the first sidewall 432 of the second portion 436 of the substrate 104 or the sidewall 430 of the first dielectric layer 102. The second sidewall 510 of the first dielectric structure 504 at least one of aligns with, is in direct contact with, or is in indirect contact with at least one of the first sidewall 432 of the second portion 436 of the substrate 104 or the sidewall 430 of the first dielectric layer 102. In some embodiments, one or more layers, such as a buffer layer, are between the second sidewall 510 of the first dielectric structure 504 and at least one of the first sidewall 432 of the second portion 436 of the substrate 104 or the sidewall 430 of the first dielectric layer 102.

In some embodiments, a distance 540 (shown in FIG. 5B) between the first sidewall 508 of the first dielectric structure 504 and the second sidewall 510 of the first dielectric structure 504 is between about 5,000 angstroms and about 30,000 angstroms. Other values of the distance 540 are within the scope of the present disclosure.

A third sidewall 514 of the first dielectric structure 504 (shown in FIG. 5C) is adjacent at least one of the sidewall 412 of the substrate 104 or the sidewall 410 of the first dielectric layer 102. The third sidewall 514 of the first dielectric structure 504 at least one of aligns with, is in direct contact with, or is in indirect contact with at least one of the sidewall 412 of the substrate 104 or the sidewall 410 of the first dielectric layer 102. In some embodiments, one or more layers, such as a buffer layer, are between the third sidewall 514 of the first dielectric structure 504 and at least one of the sidewall 412 of the substrate 104 or the sidewall 410 of the first dielectric layer 102.

A fourth sidewall 512 of the first dielectric structure 504 (shown in FIG. 5C) is adjacent at least one of the first sidewall 416 of the third portion 402 of the substrate 104 or the first sidewall 414 of the first portion 408 of the first dielectric layer 102. The fourth sidewall 512 of the first dielectric structure 504 at least one of aligns with, is in direct contact with, or is in indirect contact with at least one of the first sidewall 416 of the third portion 402 of the substrate 104 or the first sidewall 414 of the first portion 408 of the first dielectric layer 102. In some embodiments, one or more layers, such as a buffer layer, are between the fourth sidewall 512 of the first dielectric structure 504 and at least one of the first sidewall 416 of the third portion 402 of the substrate 104 or the first sidewall 414 of the first portion 408 of the first dielectric layer 102.

In some embodiments, a distance 526 (shown in FIG. 5C) between a top surface of the first dielectric layer 102 and a bottom surface of the first dielectric structure 504 is between about 30,000 angstroms and about 90,000 angstroms. Other values of the distance 526 are within the scope of the present disclosure. In some embodiments, a distance 528 (shown in FIG. 5C) between a top surface of the substrate 104 and the bottom surface of the first dielectric structure 504 is between about 20,000 angstroms and about 70,000 angstroms. Other values of the distance 528 are within the scope of the present disclosure. In some embodiments, a distance 530 (shown in FIG. 5C) between the third sidewall 514 of the first dielectric structure 504 and the fourth sidewall 512 of the first dielectric structure 504 is between about 70,000 angstroms and about 150,000 angstroms. Other values of the distance 530 are within the scope of the present disclosure.

A second dielectric structure 506 is formed in the second trench 406, such as by filling the second trench 406 with a second dielectric material to form the second dielectric structure 506. In some embodiments, the second dielectric layer 502 is formed in the second trench 406 to form the second dielectric structure 506. The second dielectric structure 506 is at least one of a portion of the second dielectric layer 502 in the second trench 406 or a portion of the second dielectric layer 502 that fills the second trench 406.

A first sidewall 520 of the second dielectric structure 506 (shown in FIG. 5E) is adjacent at least one of the second sidewall 440 of the first portion 434 of the substrate 104 or the sidewall 438 of the first dielectric layer 102. The first sidewall 520 of the second dielectric structure 506 at least one of aligns with, is in direct contact with, or is in indirect contact with at least one of the second sidewall 440 of the first portion 434 of the substrate 104 or the sidewall 438 of the first dielectric layer 102. In some embodiments, one or more layers, such as a buffer layer, are between the first sidewall 520 of the second dielectric structure 506 and at least one of the second sidewall 440 of the first portion 434 of the substrate 104 or the sidewall 438 of the first dielectric layer 102.

A second sidewall 522 of the second dielectric structure 506 (shown in FIG. 5E) is adjacent at least one of the second sidewall 444 of the second portion 436 of the substrate 104 or the sidewall 442 of the first dielectric layer 102. The second sidewall 522 of the second dielectric structure 506 at least one of aligns with, is in direct contact with, or is in indirect contact with at least one of the second sidewall 444 of the second portion 436 of the substrate 104 or the sidewall 442 of the first dielectric layer 102. In some embodiments, one or more layers, such as a buffer layer, are between the second sidewall 522 of the second dielectric structure 506 and at least one of the second sidewall 444 of the second portion 436 of the substrate 104 or the sidewall 442 of the first dielectric layer 102.

In some embodiments, a distance 542 (shown in FIG. 5E) between the first sidewall 520 of the second dielectric structure 506 and the second sidewall 522 of the second dielectric structure 506 is between about 5,000 angstroms and about 30,000 angstroms. The distance 542 is about equal to the distance 540 or the distance 542 is different than the distance 540. Other values of the distance 542 are within the scope of the present disclosure.

A third sidewall 518 of the second dielectric structure 506 (shown in FIG. 5C) is adjacent at least one of the second sidewall 420 of the third portion 402 of the substrate 104 or the second sidewall 418 of the first portion 408 of the first dielectric layer 102. The third sidewall 518 of the second dielectric structure 506 at least one of aligns with, is in direct contact with, or is in indirect contact with at least one of the second sidewall 420 of the third portion 402 of the substrate 104 or the second sidewall 418 of the first portion 408 of the first dielectric layer 102. In some embodiments, one or more layers, such as a buffer layer, are between the third sidewall 518 of the second dielectric structure 506 and at least one of the second sidewall 420 of the third portion 402 of the substrate 104 or the second sidewall 418 of the first portion 408 of the first dielectric layer 102.

A fourth sidewall 516 of the second dielectric structure 506 (shown in FIG. 5C) is adjacent at least one of the sidewall 424 of the substrate 104 or the sidewall 422 of the first dielectric layer 102. The fourth sidewall 516 of the second dielectric structure 506 at least one of aligns with, is in direct contact with, or is in indirect contact with at least one of the sidewall 424 of the substrate 104 or the sidewall 422 of the first dielectric layer 102. In some embodiments, one or more layers, such as a buffer layer, are between the fourth sidewall 516 of the second dielectric structure 506 and at least one of the sidewall 424 of the substrate 104 or the sidewall 422 of the first dielectric layer 102.

In some embodiments, a distance 536 (shown in FIG. 5C) between the top surface of the first dielectric layer 102 and a bottom surface of the second dielectric structure 506 is between about 30,000 angstroms and about 90,000 angstroms. The distance 536 is about equal to the distance 526 or the distance 536 is different than the distance 526. Other values of the distance 536 are within the scope of the present disclosure. In some embodiments, a distance 534 (shown in FIG. 5C) between the top surface of the substrate 104 and the bottom surface of the second dielectric structure 506 is between about 20,000 angstroms and about 70,000 angstroms. The distance 534 is about equal to the distance 528 or the distance 534 is different than the distance 528. Other values of the distance 534 are within the scope of the present disclosure. In some embodiments, a distance 532 (shown in FIG. 5C) between the third sidewall 518 of the second dielectric structure 506 and the fourth sidewall 516 of the second dielectric structure 506 is between about 70,000 angstroms and about 150,000 angstroms. The distance 532 is about equal to the distance 530 or the distance 532 is different than the distance 530. Other values of the distance 532 are within the scope of the present disclosure.

The waveguide 302 at least one of is between the first dielectric structure 504 and the second dielectric structure 506, is over the first dielectric structure 504 and the second dielectric structure 506, or overlies the third portion 402 of the substrate 104 between the first dielectric structure 504 and the second dielectric structure 506. A portion of the waveguide 302 extends in a direction 313 away from at least one of the first sidewall 508 of the first dielectric structure 504 or the first sidewall 520 of the second dielectric structure 506. A portion of the waveguide 302, such as comprising the first portion 310 (FIG. 3A) of the waveguide 302, extends in the direction 312 away from at least one of the second sidewall 510 of the first dielectric structure 504 or the second sidewall 522 of the second dielectric structure 506.

FIGS. 6A, 6B, and 6C illustrate formation of a third dielectric structure 602, comprising a portion of the first dielectric layer 102 and a portion of the second dielectric layer 502, over the substrate 104, according to some embodiments. A portion of the waveguide 302 is in the third dielectric structure 602. In some embodiments, a distance 604 (shown in FIG. 6B) between a bottom surface of the third dielectric structure 602 and a top surface of the third dielectric structure 602 is between about 30,000 angstroms and about 90,000 angstroms. Other values of the distance 604 are within the scope of the present disclosure. In some embodiments, at least one of the bottom surface of the third dielectric structure 602 corresponds to a bottom surface of the first dielectric layer 102 or the top surface of the third dielectric structure 602 corresponds to a top surface of the second dielectric layer 502. In some embodiments, a distance 606 (shown in FIG. 6C) between a first side 608 of the third dielectric structure 602 and a second side 610 of the third dielectric structure 602 is between about 20,000 angstroms and about 100,000 angstroms. Other values of the distance 606 are within the scope of the present disclosure.

One or more portions of the first dielectric layer 102 and the second dielectric layer 502 are removed to at least one of form the third dielectric structure 602 or expose the first side 608 and the second side 610 of the third dielectric structure 602, such as by patterning the first dielectric layer 102 and the second dielectric layer 502 using a photoresist (not shown). The photoresist is formed over the second dielectric layer 502. The photoresist is formed by at least one of PVD, sputtering, CVD, LPCVD, ALCVD, UHVCVD, RPCVD, ALD, MBE, LPE, spin on, growth, or other suitable techniques. The photoresist comprises a light-sensitive material, where properties, such as solubility, of the photoresist are affected by light. The photoresist is a negative photoresist or a positive photoresist.

One or more etchants have a selectivity such that the one or more etchants remove or etch away one or more layers exposed or not covered by the photoresist at a greater rate than the one or more etchants remove or etch away the photoresist. In some embodiments, the one or more layers comprise the second dielectric layer 502 and the first dielectric layer 102. An opening in the photoresist allows the one or more etchants to form a corresponding opening, such as an opening adjacent the first side 608 of the third dielectric structure 602 and an opening adjacent the second side 610 of the third dielectric structure 602, in the one or more layers under the photoresist, and thereby transfer a pattern in the photoresist to the one or more layers under the photoresist. The photoresist is removed after the pattern transfer, such as by at least one of CMP, etching, or other suitable techniques. According to some embodiments, the photoresist is at least one of stripped or washed away using at least one of HF, diluted HF, a chlorine compound such as $HCl_2$, $H_2S$, or other suitable material.

An etching process used to form the third dielectric structure 602 is at least one of a dry etching process, a wet etching process, an anisotropic etching process, an isotropic etching process, or another suitable process. The etching process uses at least one of HF, diluted HF, a chlorine compound such as $HCl_2$, $H_2S$, or other suitable material. Other processes and techniques for forming the third dielectric structure 602 are within the scope of the present disclosure.

FIGS. 7A, 7B, 7C, 7D, 7E, and 7F illustrate formation of a void 702 between the third dielectric structure 602 and the substrate 104, according to some embodiments. The second portion 436 (shown in FIGS. 4B, 4D, 5B, 5E) of the substrate 104 is removed to at least one of expose the bottom surface of the third dielectric structure 602, expose a surface 708 of the substrate 104, or create the void 702. In some embodiments, the second portion 436 of the substrate 104 is removed to create the void 702 using an etching process. The etching process is at least one of a dry etching process, a wet etching process, an anisotropic etching process, an isotropic etching process, or another suitable process. The etching process uses at least one of HF, diluted HF, a chlorine compound such as $HCl_2$, $H_2S$, or other suitable material. Other processes and techniques for forming the void 702 are within the scope of the present disclosure.

In some embodiments, a distance 706 (shown in FIG. 7B) between the bottom surface of the third dielectric structure 602 and the surface 708 of the substrate 104 is between about 20,000 angstroms and about 70,000 angstroms. The distance 706 is about equal to at least one of the distance 528 (shown in FIG. 5C) between the top surface of the substrate 104 and the bottom surface of the first dielectric structure 504 or the distance 534 (shown in FIG. 5C) between the top surface of the substrate 104 and the bottom surface of the second dielectric structure 506, or the distance 706 is different than at least one of the distance 528 or the distance 534. Other values of the distance 706 are within the scope of the present disclosure.

At least one of the first dielectric structure 504 or the second dielectric structure 506 inhibits removal of the first portion 434 (shown in FIGS. 4B, 4D, 5B, 5E) of the substrate 104 when the second portion 436 of the substrate 104 is removed to create the void 702, such as by etching.

In some embodiments, the void 702 is defined by at least one of the second sidewall 510 of the first dielectric structure 504 (shown in FIG. 7B) or the second sidewall 522 of the second dielectric structure 506 (shown in FIG. 7E). In some embodiments, at least one of a portion of the first dielectric structure 504 or a portion of the second dielectric structure 506 are removed when the second portion 436 of the substrate 104 is removed. One or more etchants remove or etch away portions of the substrate 104 at a greater rate than the one or more etchants remove or etch away at least one of the first dielectric structure 504 or the second dielectric structure 506.

In some embodiments, the void 702 is defined by a third sidewall 704 of the third portion 402 of the substrate 104 (shown in FIG. 7D) between the first dielectric structure 504 and the second dielectric structure 506.

FIGS. 8A, 8B, 8C, 8D, 8E, and 8F illustrate the semiconductor device 100 according to some embodiments where a portion 403 (FIG. 7D) of the third portion 402 of the substrate 104 is removed. In some embodiments, the portion 403 of the third portion 402 of the substrate 104 is removed when the second portion 436 of the substrate 104 is removed. The etching process used to remove the second portion 436 of the substrate 104 removes the portion 403 of the third portion 402 of the substrate 104. Removal of the portion 403 of the third portion 402 creates a second void 802 (shown in FIGS. 8D and 8F) between the first dielectric structure 504 and the second dielectric structure 506. In some embodiments, the waveguide 302 overlies the second void 802. In some embodiments, the second void 802 is defined by at least the fourth sidewall 512 of the first dielectric structure 504, the third sidewall 518 of the second dielectric structure 506, and the third sidewall 704 of the third portion 402 of the substrate 104, which has been moved back, recessed, or moved from right to left on the page in FIG. 8D when the second portion 436 of the substrate 104 is removed. Other processes and techniques for forming the second void 802 are within the scope of the present disclosure.

In some embodiments, an optical signal is propagated via at least some of the waveguide 302. The waveguide 302 is surrounded by material, such as portions of at least one of the first dielectric layer 102 or the second dielectric layer 502, having a refractive index less than a refractive index of the waveguide 302. Where at least one of the first dielectric layer 102 or the second dielectric layer 502 comprise $SiO_2$, the refractive index of the material surrounding the waveguide 302 is between about 1.4 and about 1.6. Other refractive indices of the material surrounding the waveguide 302 are within the scope of the present disclosure. Where the waveguide 302 is a silicon waveguide, the refractive index of the waveguide 302 is between about 3.3 and about 3.7. Other refractive indices of the waveguide 302 are within the scope of the present disclosure. At least one of the waveguide 302 or the material surrounding the waveguide 302 is configured to guide the optical signal into or through the waveguide 302. The refractive index of the material surrounding the waveguide 302 being less than the refractive index of the waveguide 302 provides for at least some of the optical signal being reflected by the material surrounding the waveguide 302 such that the optical signal at least one of remains within the waveguide 302 or is inhibited from exiting from the waveguide 302 so as to be propagated via the waveguide 302. The optical signal is propagated in at least one of the direction 312 or a direction different than, such as opposite, the direction 312.

In some embodiments, the third dielectric structure 602 is a coupler structure configured to transfer the optical signal to a component, such as at least one of an optical fiber, a semiconductor device, or a different component. In some embodiments, the optical signal is transferred from the waveguide 302 to the component as a result of the optical signal reaching a portion of the waveguide 302 that is less than a threshold size, such as at least a portion of the first portion 310 of the waveguide 302 (shown in FIG. 3A). The optical signal is transferred from the waveguide 302 to the component as a result of the waveguide 302, such as the first portion 310 of the waveguide 302, decreasing in size or tapering along the direction 312. The optical signal is transferred from the waveguide 302 to the component as a result of the cross-sectional area of the waveguide 302, such as the cross-sectional area of the first portion 310 of the waveguide 302, decreasing in the direction 312.

The void 702 disposed between the third dielectric structure 602 and the substrate 104 inhibits the optical signal from at least one of leaking out of the third dielectric structure 602 or into the substrate 104, such as due to the refractive index of the void, such as from one or more gasses in the void. By implementing at least one of the first dielectric structure 504 or the second dielectric structure 506 in the semiconductor device 100, a length 710 (shown in FIG. 7E) of the void 702 does not exceed a first threshold length due to at least one of the first dielectric structure 504 or the second dielectric structure 506 inhibiting removal of the first portion 434 of the substrate 104 when the second portion 436 of the substrate 104 (shown in FIG. 4B, 4D, 5B, 5E) is removed to create the void 702. The length 710 exceeding the first threshold length allows the third dielectric structure 602 to at least one of break or bend towards the substrate 104 due to insufficient structural support for the third dielectric structure 602. Such deflection of the third dielectric structure 602 causes a reduction in the optical signal being transferred from the waveguide 302 to the component at least due to a misalignment of third dielectric structure 602 with the component. By implementing at least one of the first dielectric structure 504 or the second dielectric structure 506 in the semiconductor device 100, the length 710 of the void 702 is not less than a second threshold length. The length 710 not being less than the second threshold length inhibits leakage of the optical signal into the substrate 104, such as by having the void as opposed to the substrate 104 immediately under the third dielectric structure 602.

Implementing at least one of the first dielectric structure 504 or the second dielectric structure 506 provides for controlling removal of the second portion 436 (shown in FIG. 4B, 4D, 5B, 5E) of the substrate 104 more accurately due to at least one of the first dielectric structure 504 or the second dielectric structure 506 inhibiting removal of the first portion 434 of the substrate 104. Implementing at least one of the first dielectric structure 504 or the second dielectric structure 506 provides for controlling removal of the second portion 436 of the substrate 104 such that the length 710 of the void 702 at least one of does not exceed the first threshold length or is not less than the second threshold length, and the alignment of the third dielectric structure 602 with the component is thereby promoted and leakage of the optical signal into the substrate is inhibited.

Figure 14A:
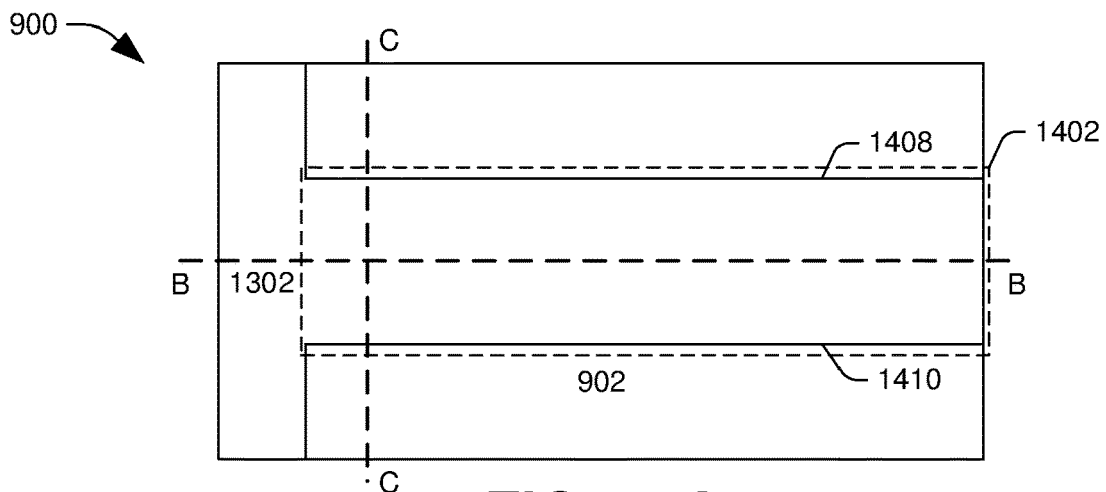
FIGS. 14A-14C illustrate a semiconductor device at a stage of fabrication, in accordance with some embodiments.
Figure 14B:
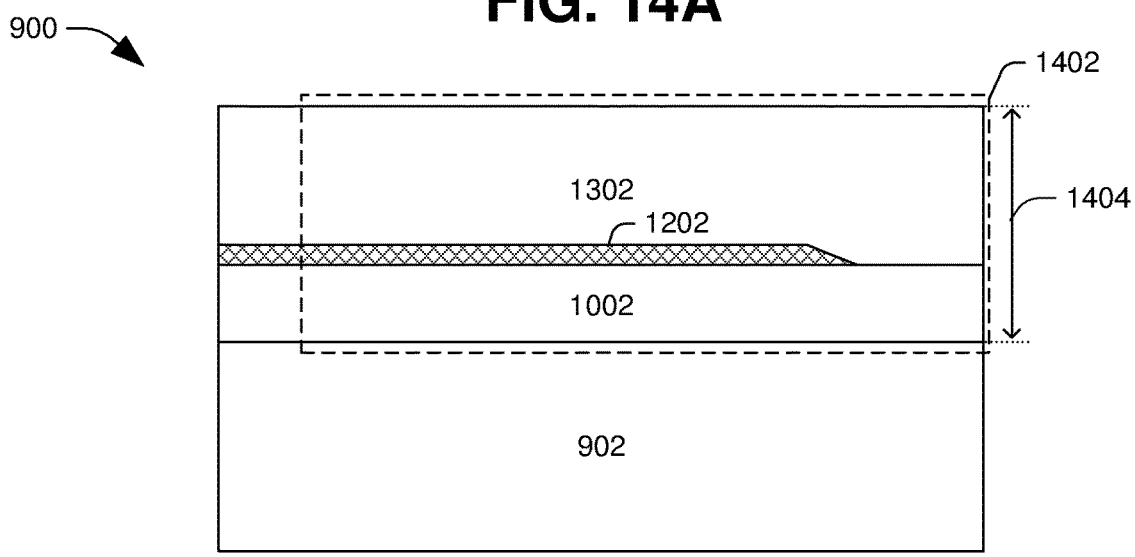
Figure 14C:
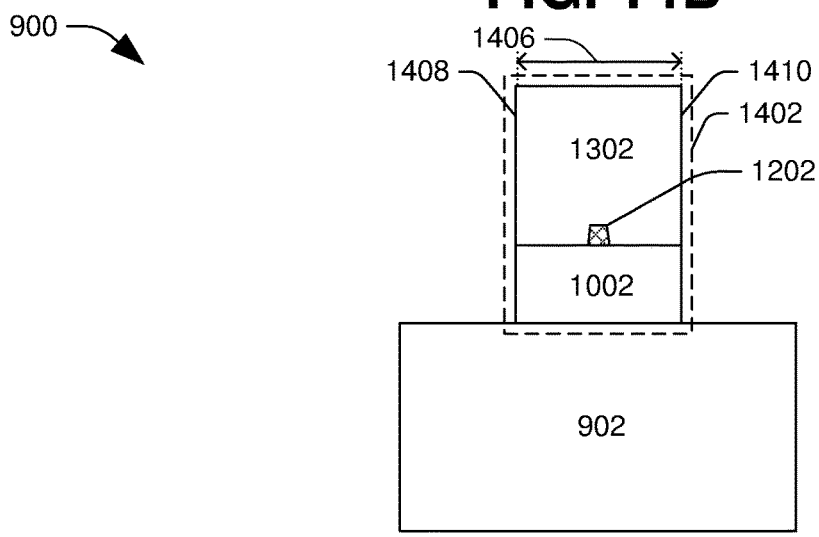
Figure 15A:
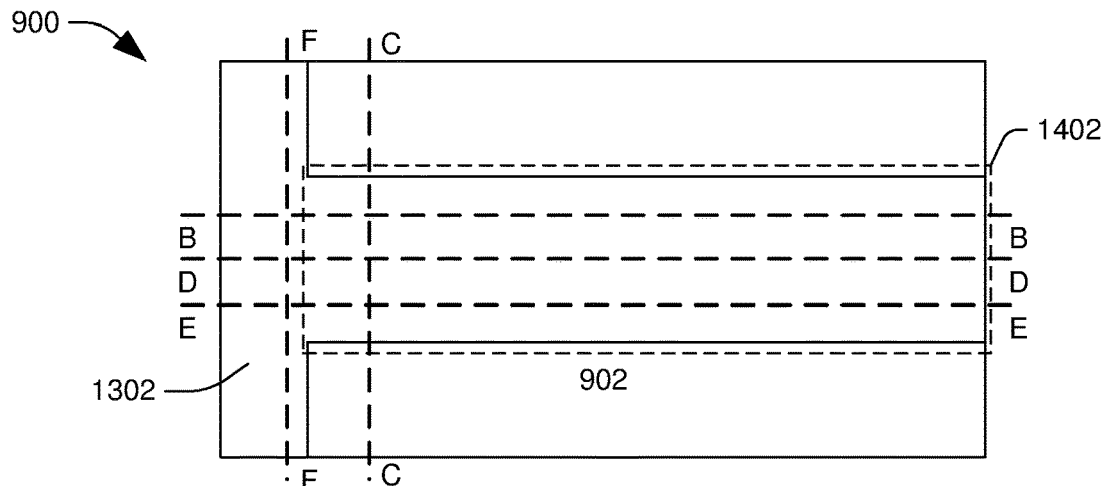
FIGS. 15A-15F illustrate a semiconductor device at a stage of fabrication, in accordance with some embodiments.
Figure 15B:
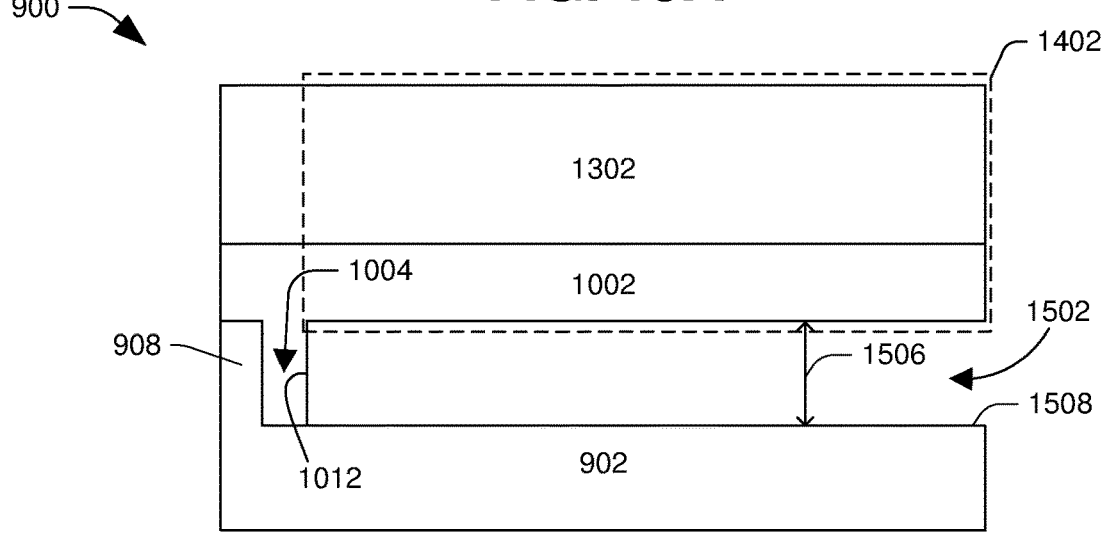
Figure 15C:
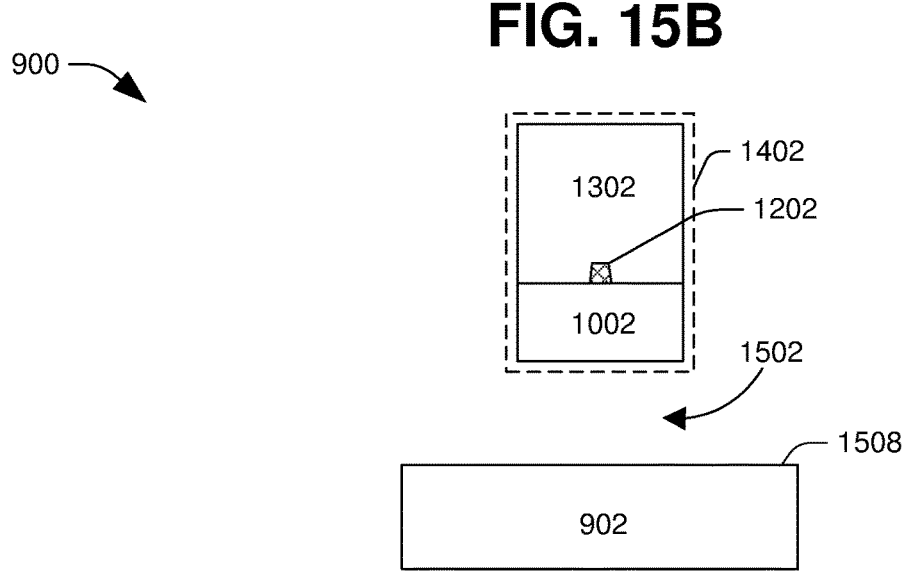
Figure 15D:
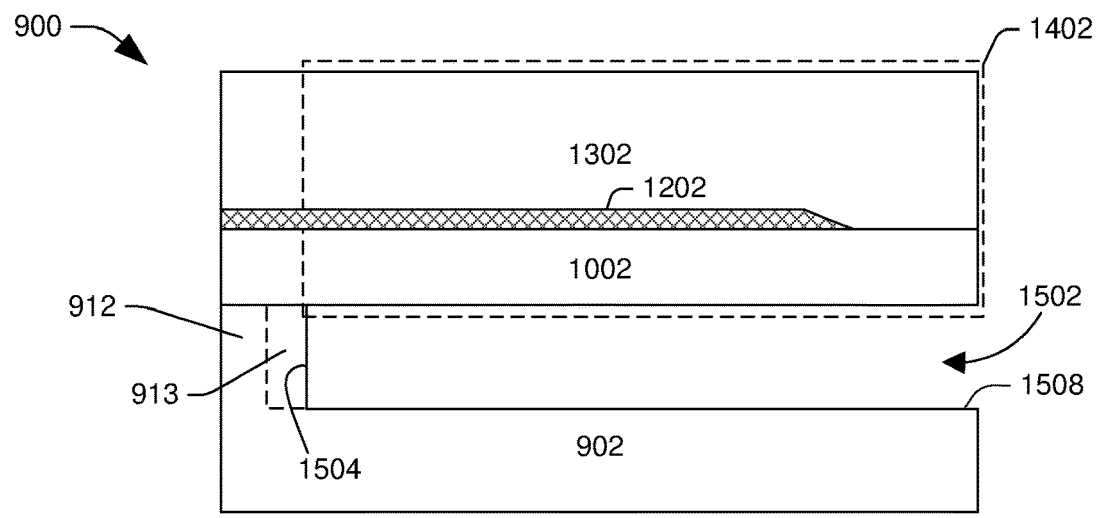
Figure 15E:
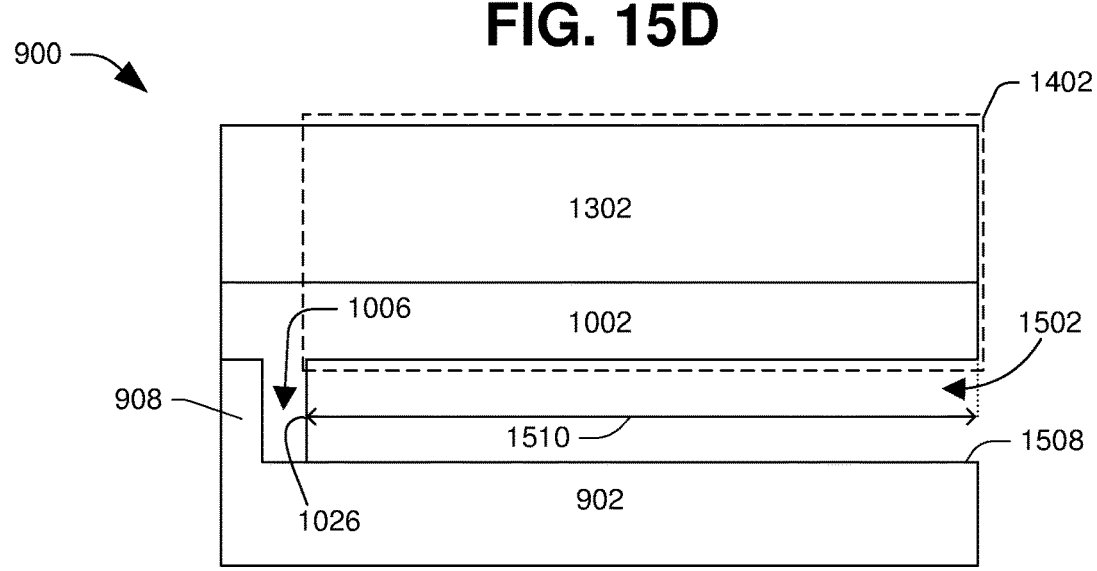
Figure 15F:
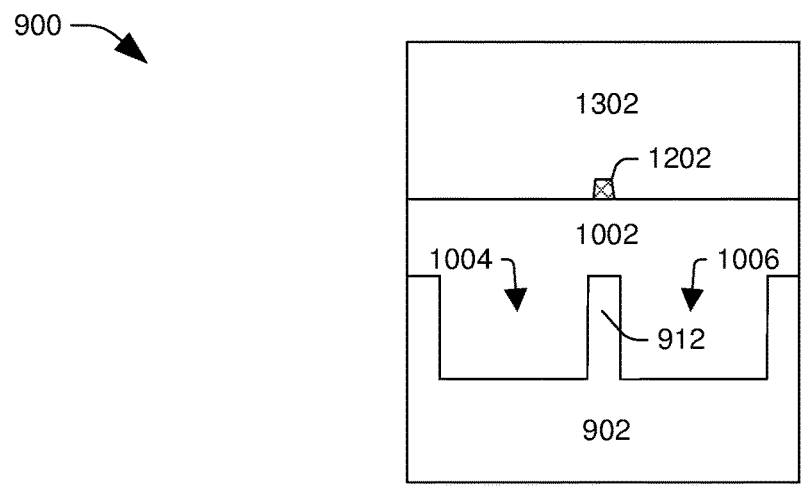
Figure 16A:
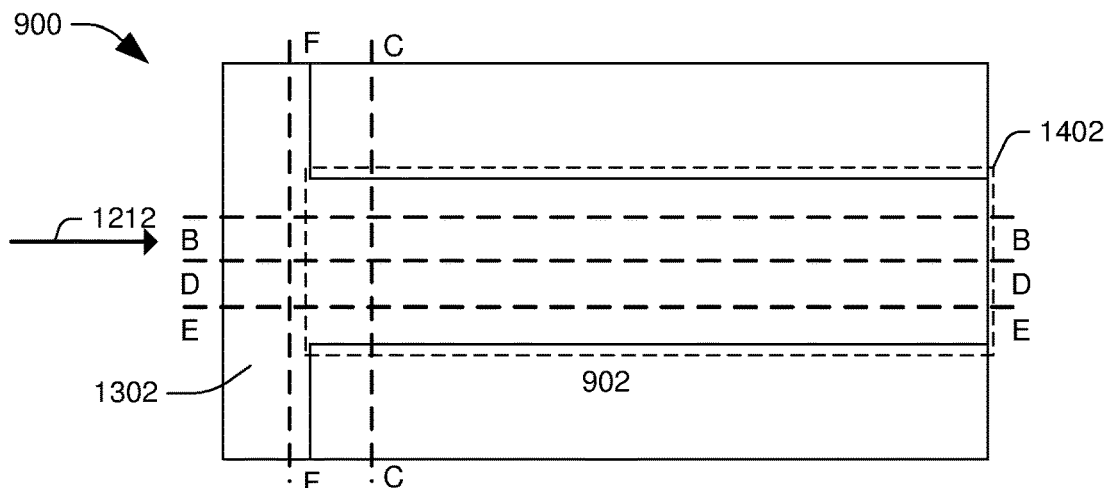
FIGS. 16A-16F illustrate a semiconductor device at a stage of fabrication, in accordance with some embodiments.
Figure 16B:
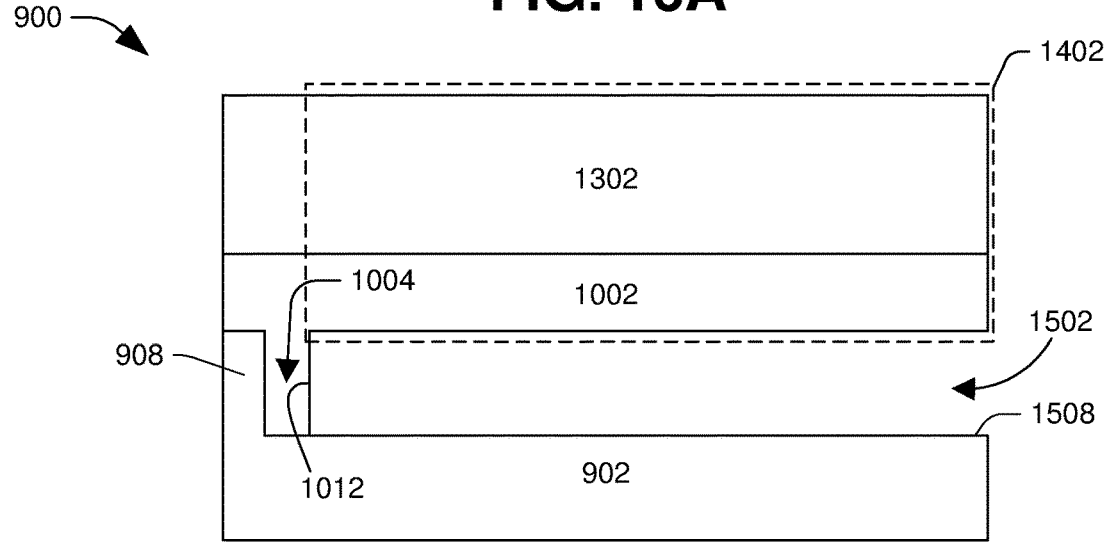
Figure 16C:
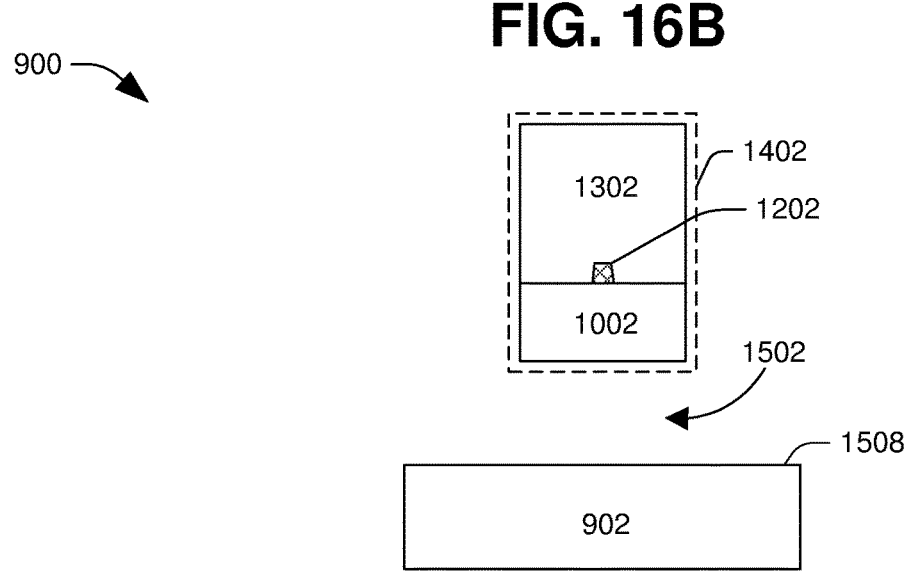
Figure 16D:
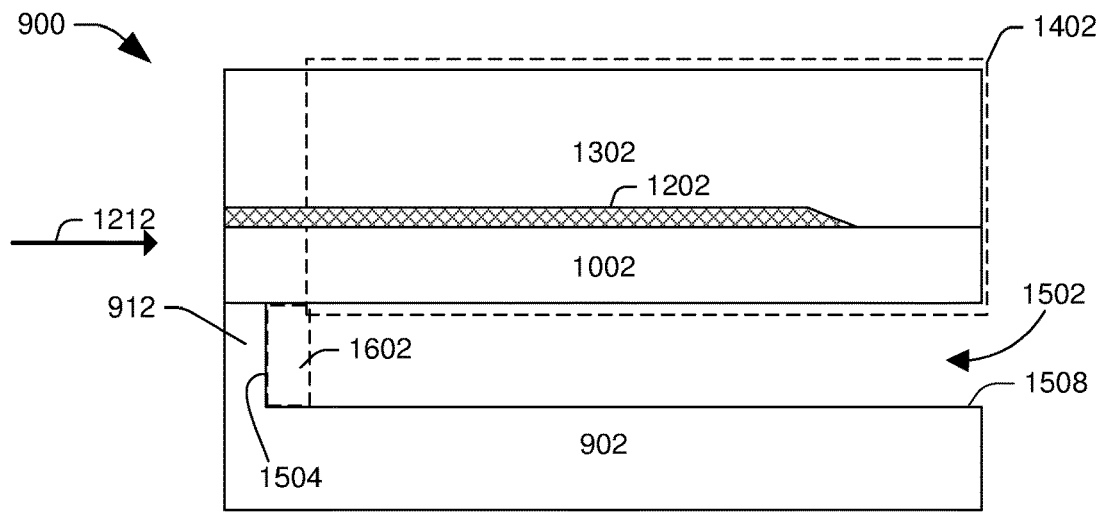
Figure 16E:
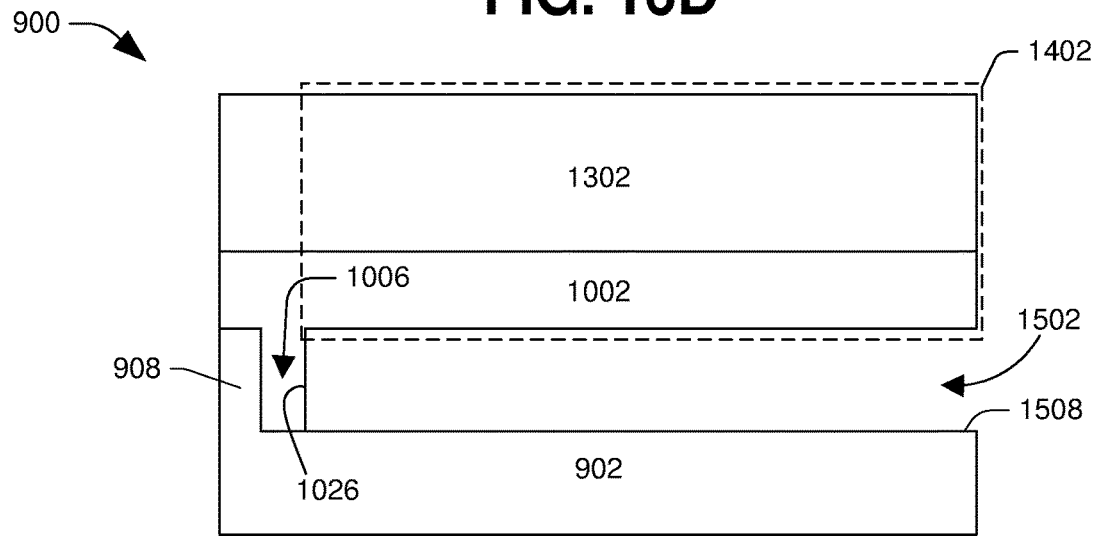
Figure 16F:
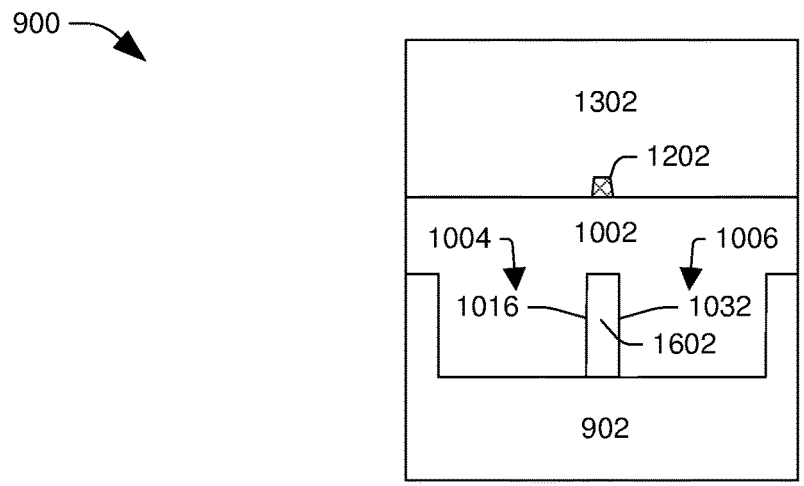

FIGS. 9A-16F illustrate a semiconductor device 900 at various stages of fabrication, in accordance with some embodiments. FIGS. 9A, 10A, 11A, 12A, 13A, 14A, 15A, and 16A illustrate top views of the semiconductor device 900 at various stages of fabrication. FIGS. 9B, 10B, 11B, 12B, 13B, 14B, 15B, and 16B illustrate cross-sectional views of the semiconductor device 900 taken along lines B-B of FIGS. 9A, 10A, 11A, 12A, 13A, 14A, 15A, and 16A, respectively. FIGS. 9C, 100, 110, 12C, 13C, 14C, 15C, and 16C illustrate cross-sectional views of the semiconductor device 900 taken along lines C-C of FIGS. 9A, 10A, 11A, 12A, 13A, 14A, 15A, and 16A, respectively. FIGS. 9D, 10D, 15D, and 16D illustrate cross-sectional views of the semiconductor device 900 taken along lines D-D of FIGS. 9A, 10A, 15A, and 16A, respectively. FIGS. 10E, 15E, and 16E illustrate cross-sectional views of the semiconductor device 900 taken along lines E-E of FIGS. 10A, 15A, and 16A, respectively. FIGS. 15F and 16F illustrate cross-sectional views of the semiconductor device 900 taken along lines F-F of FIGS. 15A and 16A, respectively. The views illustrated in FIGS. 9C, 10O, 11O, 12C, 13C, 14C, 15C, and 16C are 90-degrees relative to the views illustrated in FIGS. 9B, 10B, 11B, 12B, 13B, 14B, 15B, and 16B, respectively. The views illustrated in FIGS. 9C, 10O, 15C, and 16C are 90-degrees relative to the views illustrated in FIGS. 9D, 10D, 15D, and 16D, respectively. The views illustrated in FIGS. 10O, 15C, and 16C are 90-degrees relative to the views illustrated in FIGS. 10E, 15E, and 16E, respectively. The views illustrated in FIGS. 15F and 16F are 90-degrees relative to the views illustrated in FIGS. 15B and 16B, respectively.

In some embodiments, the semiconductor device 900 comprises at least one of a communication device, such as a transceiver, a photonic device, such as a silicon-based photonic IC, or a different type of device. The semiconductor device 900 is configured for at least one of optical communication or propagation of an optical signal. Other structures and configurations of the semiconductor device 900 are within the scope of the present disclosure.

FIGS. 9A, 9B, 9C, and 9D illustrate the semiconductor device 900 according to some embodiments. In some embodiments, the semiconductor device 900 comprises a substrate 902. The substrate 902 comprises at least one of an epitaxial layer, a SOI structure, a wafer, or a die formed from a wafer. Other structures and configurations of the substrate 902 are within the scope of the present disclosure. The substrate 902 comprises at least one of silicon, germanium, carbide, arsenide, gallium, arsenic, phosphide, indium, antimonide, SiGe, SiC, GaAs, GaN, GaP, InGaP, InP, InAs, InSb, GaAsP, AlInAs, AlGaAs, GaInAs, GaInP, GaInAsP, or other suitable material. According to some embodiments, the substrate 902 comprises monocrystalline silicon, crystalline silicon with a <100> crystallographic orientation, crystalline silicon with a <110> crystallographic orientation or other suitable material. In some embodiments, the substrate 902 comprises at least one doped region.

A first trench 904 and a second trench 906 are formed in the substrate 902, according to some embodiments, such as by removing portions of the substrate 902. A first portion 908 of the substrate 902 (shown in FIGS. 9B and 9D) is adjacent a first side of the first trench 904 and a first side of the second trench 906. A second portion 910 of the substrate 902 (shown in FIGS. 9B and 9D) is adjacent a second side of the first trench 904 and a second side of the second trench 906.

In some embodiments, a third portion 912 of the substrate 902 (shown in FIG. 9C) is between the first trench 904 and the second trench 906. The first trench 904 is defined by at least one of a first sidewall 916 of the third portion 912 of the substrate 902 (shown in FIG. 9C), a sidewall 914 of the substrate 902 (shown in FIG. 9C), a first sidewall 924 of the first portion 908 of the substrate 902 (shown in FIG. 9B), or a first sidewall 926 of the second portion 910 of the substrate 902 (shown in FIG. 9B). Other structures and configurations of the first trench 904 are within the scope of the present disclosure.

Figure 9A:
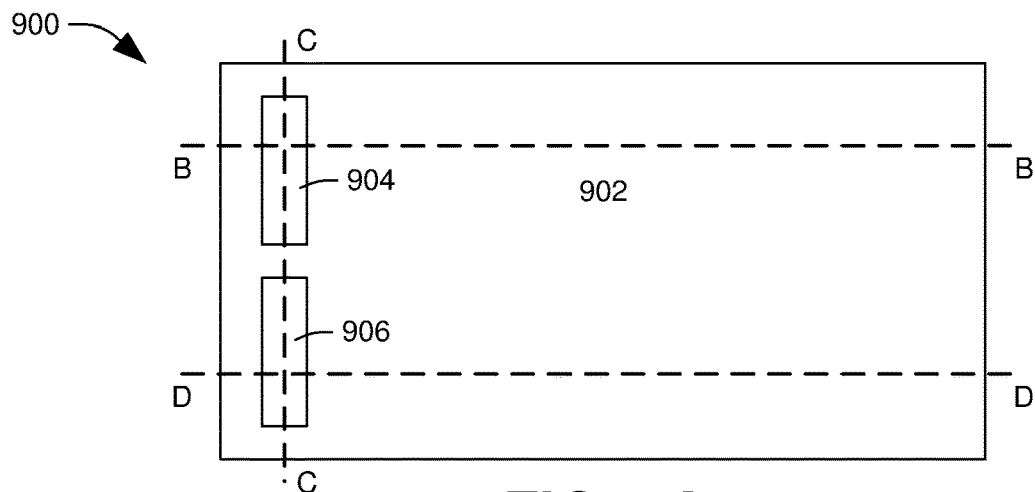
FIGS. 9A-9D illustrate a semiconductor device at a stage of fabrication, in accordance with some embodiments.
Figure 9B:
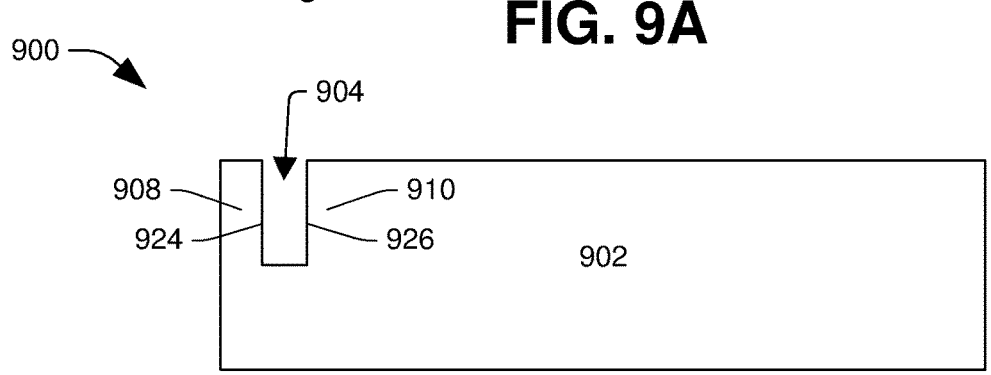
Figure 9C:
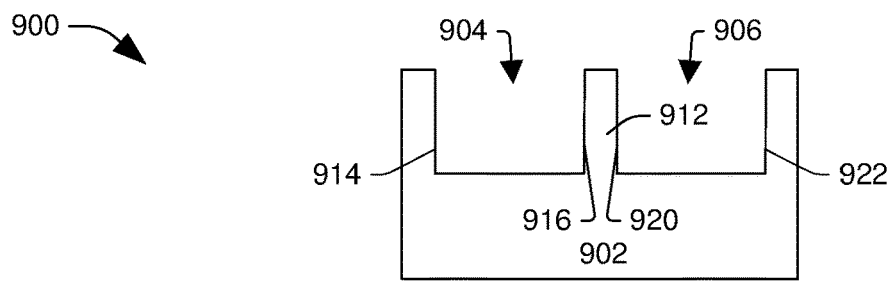
Figure 9D:
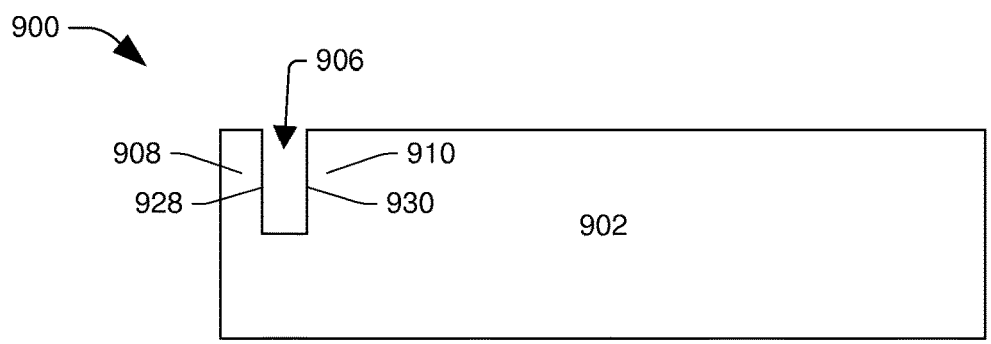
Figure 10A:
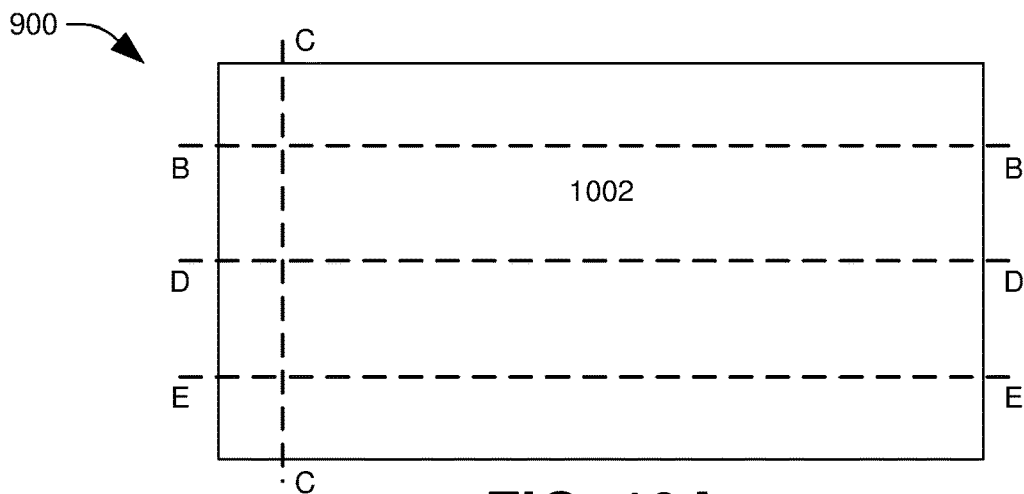
FIGS. 10A-10E illustrate a semiconductor device at a stage of fabrication, in accordance with some embodiments.
Figure 10B:
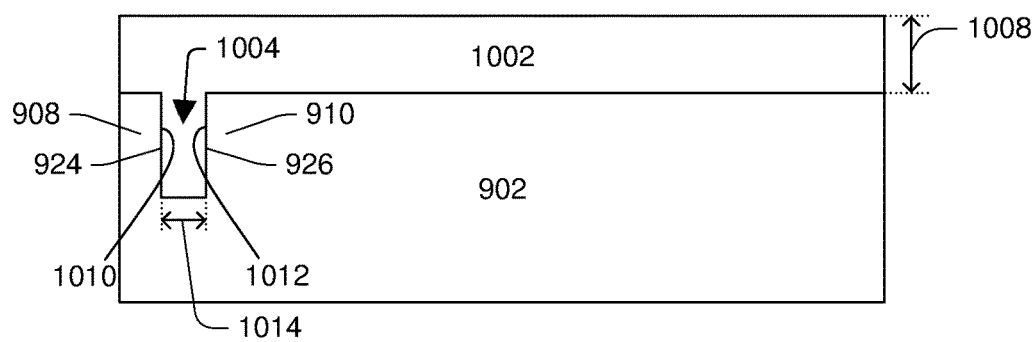
Figure 10C:
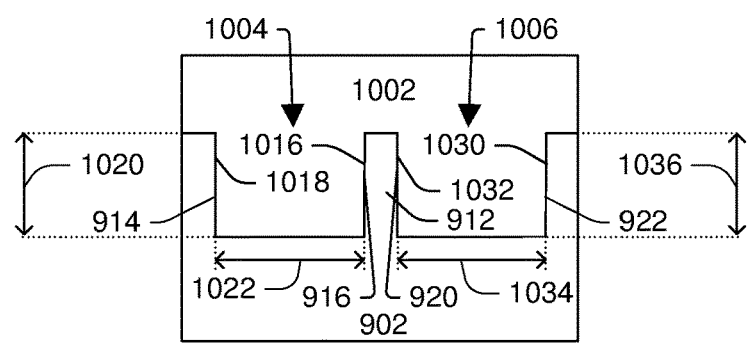
Figure 10D:
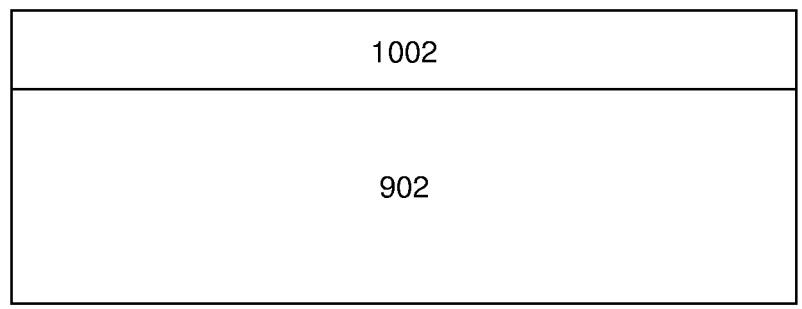
Figure 10E:
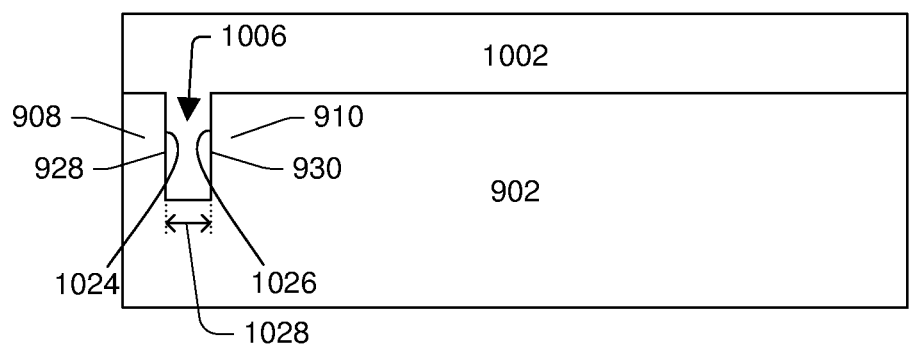

The second trench 906 is defined by at least one of a second sidewall 920 of the third portion 912 of the substrate 902 (shown in FIG. 9C), a sidewall 922 of the substrate 902 (shown in FIG. 9C), a second sidewall 928 of the first portion 908 of the substrate 902 (shown in FIG. 9D), or a second sidewall 930 of the second portion 910 of the substrate 902 (shown in FIG. 9D). Other structures and configurations of the second trench 906 are within the scope of the present disclosure.

In some embodiments, the substrate 902 is patterned to form the first trench 904 and the second trench 906, such as using a photoresist (not shown). The photoresist is formed over the substrate 902. The photoresist is formed by at least one of PVD, sputtering, CVD, LPCVD, ALCVD, UHVCVD, RPCVD, ALD, MBE, LPE, spin on, growth, or other suitable techniques. The photoresist comprises a light-sensitive material, where properties, such as solubility, of the photoresist are affected by light. The photoresist is a negative photoresist or a positive photoresist.

One or more etchants have a selectivity such that the one or more etchants remove or etch away one or more layers exposed or not covered by the photoresist at a greater rate than the one or more etchants remove or etch away the photoresist. In some embodiments, the one or more layers comprise the substrate 902. An opening in the photoresist allows the one or more etchants to form a corresponding opening, such as at least one of the first trench 904 or the second trench 906, in the one or more layers under the photoresist, and thereby transfer a pattern in the photoresist to the one or more layers under the photoresist. The photoresist is removed after the pattern transfer, such as by at least one of CMP, etching, or other suitable techniques. According to some embodiments, the photoresist is at least one of stripped or washed away using at least one of HF, diluted HF, a chlorine compound such as $HCl_2$, $H_2S$, or other suitable material.

An etching process used to form the first trench 904 and the second trench 906 is at least one of a dry etching process, a wet etching process, an anisotropic etching process, an isotropic etching process, or another suitable process. The etching process uses at least one of HF, diluted HF, a chlorine compound such as $HCl_2$, $H_2S$, or other suitable material. Other processes and techniques for forming at least one of the first trench 904 or the second trench 906 are within the scope of the present disclosure.

According to some embodiments, the first trench and the second trench are formed using a mask layer (not shown), where the mask layer is formed over the substrate 902. In some embodiments, the mask layer is a hard mask layer. The mask layer comprises at least one of oxide, nitride, a metal, or other suitable material. The mask layer is formed by at least one of PVD, sputtering, CVD, LPCVD, ALCVD, UHVCVD, RPCVD, ALD, MBE, LPE, spin on, growth, or other suitable techniques. According to some embodiments, the mask layer is patterned to form a patterned mask layer (not shown), such as using a photoresist (not shown). In some embodiments, the photoresist is removed after the patterned mask layer is formed, such as by at least one of CMP, etching, or other suitable techniques. According to some embodiments, the photoresist is at least one of stripped or washed away using at least one of HF, diluted HF, a chlorine compound such as $HCl_2$, $H_2S$, or other suitable material.

An etching process used to remove portions of the mask layer to expose portions of the substrate 902 and form the patterned mask layer is at least one of a dry etching process, a wet etching process, an anisotropic etching process, an isotropic etching process, or another suitable process. The etching process uses at least one of HF, diluted HF, a chlorine compound such as HCl₂, H₂S, or other suitable material.

In some embodiments, an etching process is performed to form the first trench 904 and the second trench 906, where openings in the patterned mask layer allow one or more etchants applied during the etching process to remove portions of the substrate 902 while the patterned mask layer protects or shields portions of the substrate 902 that are covered by the patterned mask layer. The etching process is at least one of a dry etching process, a wet etching process, an anisotropic etching process, an isotropic etching process, or another suitable process. The etching process uses at least one of HF, diluted HF, a chlorine compound such as HCl₂, H₂S, or other suitable material. In some embodiments, the patterned mask layer is removed after the first trench 904 and the second trench 906 are formed, such as by at least one of CMP, etching, or other suitable techniques. Other processes and techniques for forming at least one of the first trench 904 or the second trench 906 are within the scope of the present disclosure.

FIGS. 10A, 10B, 10C, 10D, and 10E illustrate a first dielectric layer 1002 formed over the substrate 902, according to some embodiments. The first dielectric layer 1002 at least one of overlies the substrate 902, is in direct contact with a top surface of the substrate 902, or is in indirect contact with the top surface of the substrate 902. In some embodiments, one or more layers, such as a buffer layer, are between the first dielectric layer 1002 and the substrate 902.

The first dielectric layer 1002 comprises at least one of silicon, nitride, oxide, such as SiO₂, or other suitable material. In some embodiments, the first dielectric layer 1002 is a BOX. Other structures and configurations of the first dielectric layer 1002 are within the scope of the present disclosure. The first dielectric layer 1002 is formed by at least one of PVD, sputtering, CVD, LPCVD, ALCVD, UHVCVD, RPCVD, ALD, MBE, LPE, spin on, growth, or other suitable techniques. In some embodiments, the first dielectric layer 1002 has a thickness 1008 between about 10,000 angstroms and about 30,000 angstroms. Other values of the thickness 1008 are within the scope of the present disclosure.

In some embodiments, a first dielectric structure 1004 is formed in the first trench 904, such as by filling the first trench 904 with a first dielectric material to form the first dielectric structure 1004. In some embodiments, the first dielectric layer 1002 is formed in the first trench 904 to form the first dielectric structure 1004. The first dielectric structure 1004 is at least one of a portion of the first dielectric layer 1002 in the first trench 904 or a portion of the first dielectric layer 1002 that fills the first trench 904.

A first sidewall 1010 of the first dielectric structure 1004 (shown in FIG. 10B) is adjacent the first sidewall 924 of the first portion 908 of the substrate 902. The first sidewall 1010 of the first dielectric structure 1004 at least one of aligns with, is in direct contact with, or is in indirect contact with the first sidewall 924 of the first portion 908 of the substrate 902. In some embodiments, one or more layers, such as a buffer layer, are between the first sidewall 1010 of the first dielectric structure 1004 and the first sidewall 924 of the first portion 908 of the substrate 902.

A second sidewall 1012 of the first dielectric structure 1004 (shown in FIG. 10B) is adjacent the first sidewall 926 of the second portion 910 of the substrate 902. The second sidewall 1012 of the first dielectric structure 1004 at least one of aligns with, is in direct contact with, or is in indirect contact with the first sidewall 926 of the second portion 910 of the substrate 902. In some embodiments, one or more layers, such as a buffer layer, are between the second sidewall 1012 of the first dielectric structure 1004 and the first sidewall 926 of the second portion 910 of the substrate 902.

In some embodiments, a distance 1014 (shown in FIG. 10B) between the first sidewall 1010 of the first dielectric structure 1004 and the second sidewall 1012 of the first dielectric structure 1004 is between about 5,000 angstroms and about 30,000 angstroms. Other values of the distance 1014 are within the scope of the present disclosure.

A third sidewall 1018 of the first dielectric structure 1004 (shown in FIG. 10C) is adjacent the sidewall 914 of the substrate 902. The third sidewall 1018 of the first dielectric structure 1004 at least one of aligns with, is in direct contact with, or is in indirect contact with the sidewall 914 of the substrate 902. In some embodiments, one or more layers, such as a buffer layer, are between the third sidewall 1018 of the first dielectric structure 1004 and the sidewall 914 of the substrate 902.

A fourth sidewall 1016 of the first dielectric structure 1004 (shown in FIG. 10C) is adjacent the first sidewall 916 of the third portion 912 of the substrate 902. The fourth sidewall 1016 of the first dielectric structure 1004 at least one of aligns with, is in direct contact with, or is in indirect contact with the first sidewall 916 of the third portion 912 of the substrate 902. In some embodiments, one or more layers, such as a buffer layer, are between the fourth sidewall 1016 of the first dielectric structure 1004 and the first sidewall 916 of the third portion 912 of the substrate 902.

In some embodiments, a distance 1020 (shown in FIG. 10C) between a top surface of the substrate 902 and a bottom surface of the first dielectric structure 1004 is between about 20,000 angstroms and about 70,000 angstroms. Other values of the distance 1020 are within the scope of the present disclosure. In some embodiments, a distance 1022 (shown in FIG. 10C) between the third sidewall 1018 of the first dielectric structure 1004 and the fourth sidewall 1016 of the first dielectric structure 1004 is between about 70,000 angstroms and about 150,000 angstroms. Other values of the distance 1022 are within the scope of the present disclosure.

A second dielectric structure 1006 is formed in the second trench 906, such as by filling the second trench 906 to form the second dielectric structure 1006. In some embodiments, the first dielectric layer 1002 is formed in the second trench 906 to form the second dielectric structure 1006. The second dielectric structure 1006 is at least one of a portion of the first dielectric layer 1002 in the second trench 906 or a portion of the first dielectric layer 1002 that fills the second trench 906.

A first sidewall 1024 of the second dielectric structure 1006 (shown in FIG. 10E) is adjacent the second sidewall 928 of the first portion 908 of the substrate 902. The first sidewall 1024 of the second dielectric structure 1006 at least one of aligns with, is in direct contact with, or is in indirect contact with the second sidewall 928 of the first portion 908 of the substrate 902. In some embodiments, one or more layers, such as a buffer layer, are between the first sidewall 1024 of the second dielectric structure 1006 and the second sidewall 928 of the first portion 908 of the substrate 902.

A second sidewall 1026 of the second dielectric structure 1006 (shown in FIG. 10E) is adjacent the second sidewall 930 of the second portion 910 of the substrate 902. The second sidewall 1026 of the second dielectric structure 1006 at least one of aligns with, is in direct contact with, or is in indirect contact with the second sidewall 930 of the second portion 910 of the substrate 902. In some embodiments, one or more layers, such as a buffer layer, are between the second sidewall 1026 of the second dielectric structure 1006 and the second sidewall 930 of the second portion 910 of the substrate 902.

In some embodiments, a distance 1028 (shown in FIG. 10E) between the first sidewall 1024 of the second dielectric structure 1006 and the second sidewall 1026 of the second dielectric structure 1006 is between about 5,000 angstroms and about 30,000 angstroms. The distance 1028 is about equal to the distance 1014 or the distance 1028 is different than the distance 1014. Other values of the distance 1028 are within the scope of the present disclosure.

A third sidewall 1032 of the second dielectric structure 1006 (shown in FIG. 10C) is adjacent the second sidewall 920 of the third portion 912 of the substrate 902. The third sidewall 1032 of the second dielectric structure 1006 at least one of aligns with, is in direct contact with, or is in indirect contact with the second sidewall 920 of the third portion 912 of the substrate 902. In some embodiments, one or more layers, such as a buffer layer, are between the third sidewall 1032 of the second dielectric structure 1006 and the second sidewall 920 of the third portion 912 of the substrate 902.

A fourth sidewall 1030 of the second dielectric structure 1006 (shown in FIG. 10O) is adjacent the sidewall 922 of the substrate 902. The fourth sidewall 1030 of the second dielectric structure 1006 at least one of aligns with, is in direct contact with, or is in indirect contact with the sidewall 922 of the substrate 902. In some embodiments, one or more layers, such as a buffer layer, are between the fourth sidewall 1030 of the second dielectric structure 1006 and the sidewall 922 of the substrate 902.

In some embodiments, a distance 1036 (shown in FIG. 10O) between the top surface of the substrate 902 and a bottom surface of the second dielectric structure 1006 is between about 20,000 angstroms and about 70,000 angstroms. The distance 1036 is about equal to the distance 1020 or the distance 1036 is different than the distance 1020. Other values of the distance 1036 are within the scope of the present disclosure. In some embodiments, a distance 1034 (shown in FIG. 10O) between the third sidewall 1032 of the second dielectric structure 1006 and the fourth sidewall 1030 of the second dielectric structure 1006 is between about 70,000 angstroms and about 150,000 angstroms. The distance 1034 is about equal to the distance 1022 or the distance 1034 is different than the distance 1022. Other values of the distance 1034 are within the scope of the present disclosure.

Figure 11A:
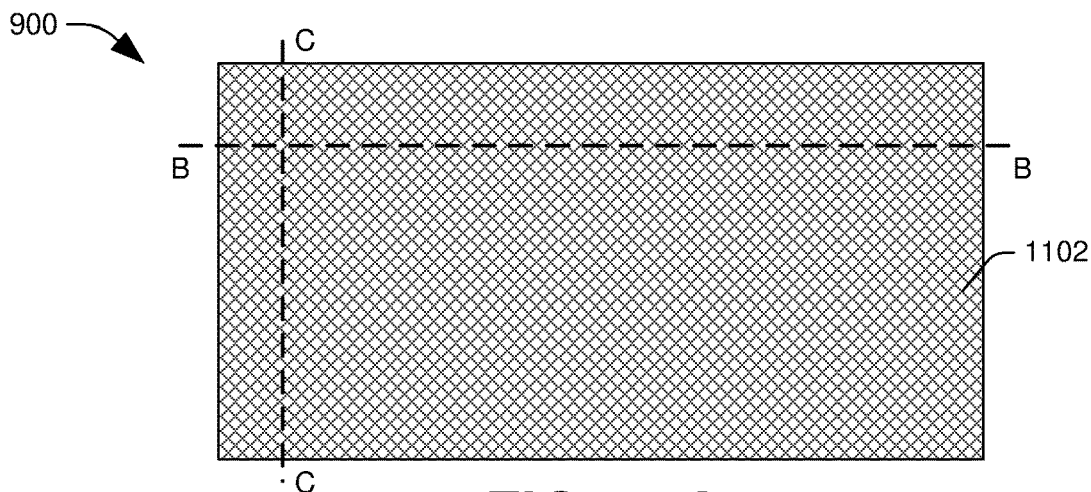
FIGS. 11A-11C illustrate a semiconductor device at a stage of fabrication, in accordance with some embodiments.
Figure 11B:
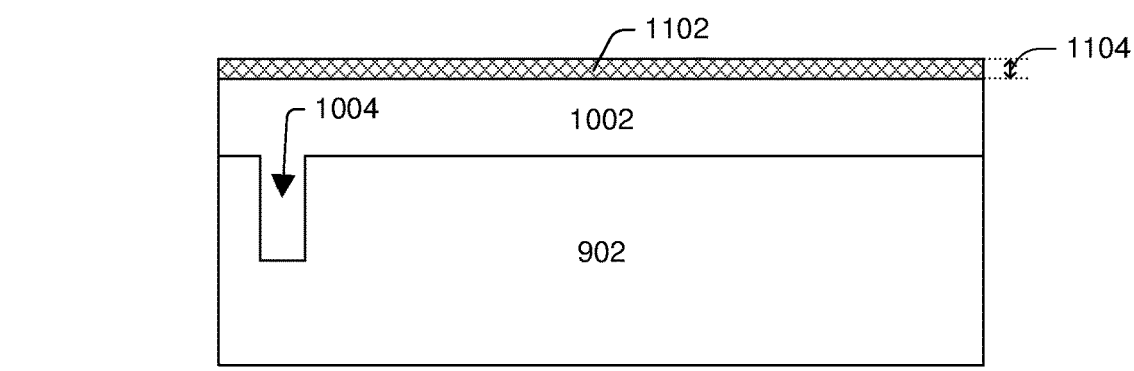
Figure 11C:
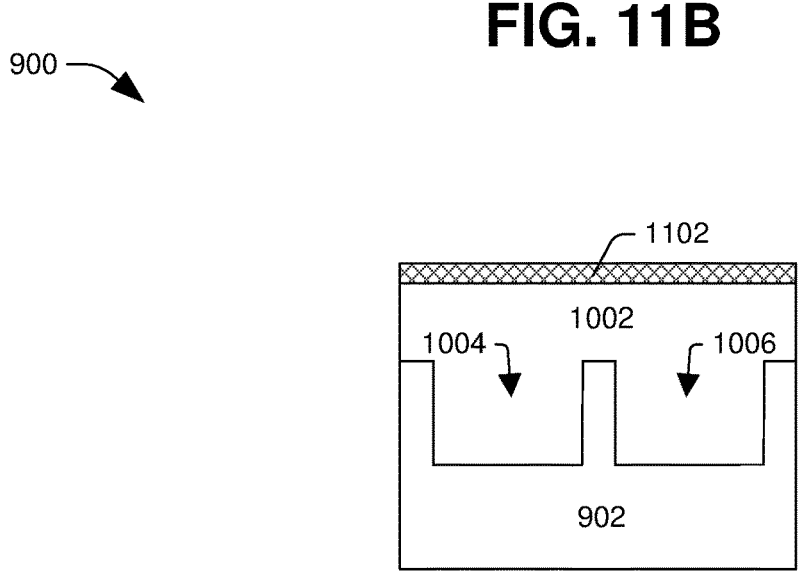

FIGS. 11A, 11B, and 11C illustrate a semiconductor layer 1102 formed over the first dielectric layer 1002, according to some embodiments. The semiconductor layer 1102 at least one of overlies the first dielectric layer 1002, is in direct contact with a top surface of the first dielectric layer 1002, or is in indirect contact with the top surface of the first dielectric layer 1002. In some embodiments, one or more layers, such as a buffer layer, are between the semiconductor layer 1102 and the first dielectric layer 1002. The semiconductor layer 1102 comprises at least one of a semiconductor material or other suitable material. According to some embodiments, the semiconductor layer 1102 comprises silicon, such as monocrystalline silicon, crystalline silicon with a <100> crystallographic orientation, crystalline silicon with a <110> crystallographic orientation or other suitable material. Other structures and configurations of the semiconductor layer 1102 are within the scope of the present disclosure. In some embodiments, the semiconductor layer 1102 has a thickness 1104 between about 2,000 angstroms and about 4,000 angstroms. Other values of the thickness 1104 are within the scope of the present disclosure.

Figure 12A:
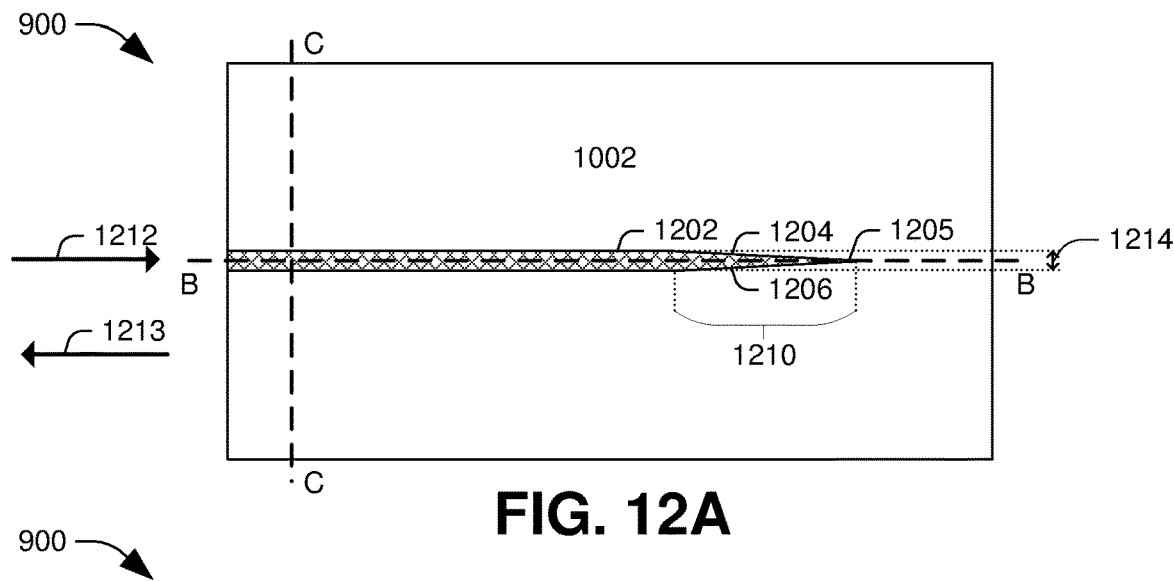
FIGS. 12A-12C illustrate a semiconductor device at a stage of fabrication, in accordance with some embodiments.
Figure 12B:
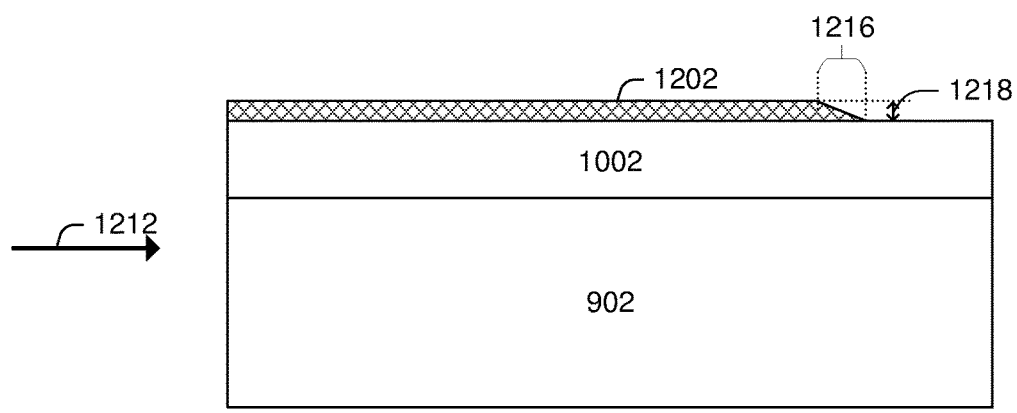
Figure 12C:
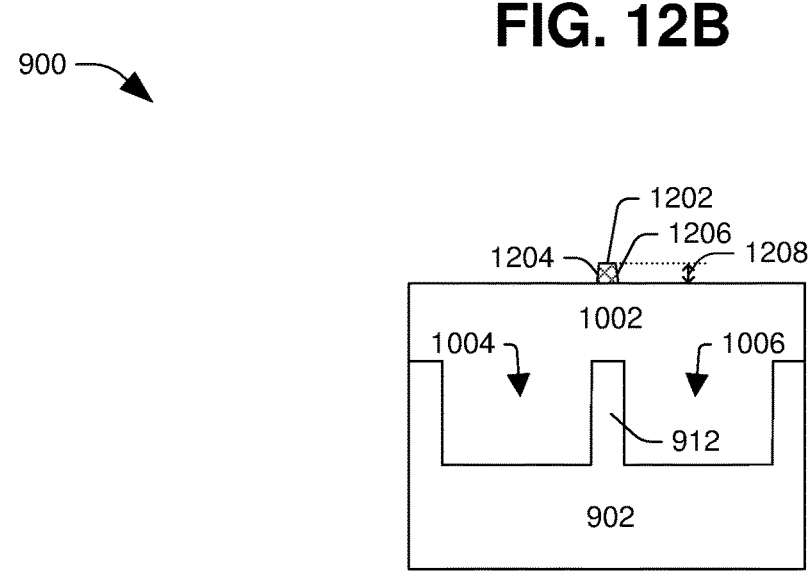
Figure 13A:
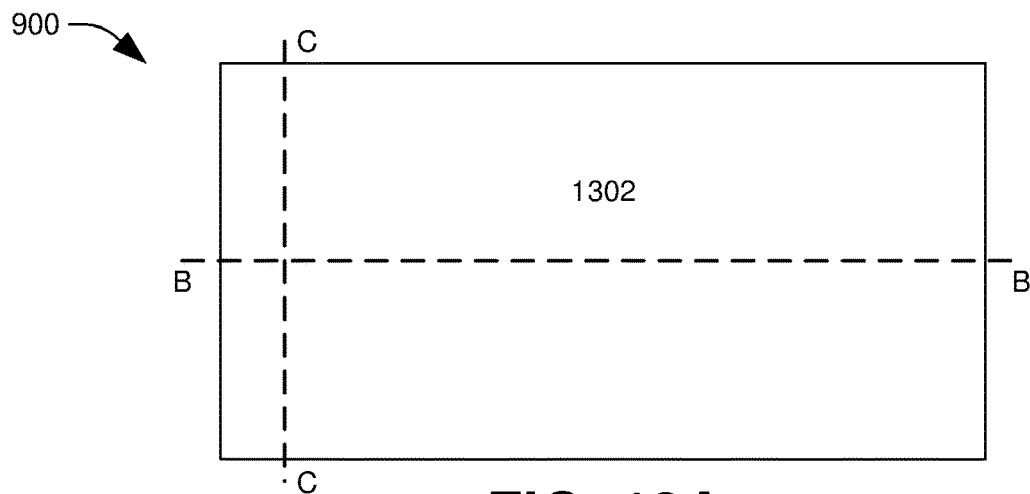
FIGS. 13A-13C illustrate a semiconductor device at a stage of fabrication, in accordance with some embodiments.
Figure 13B:
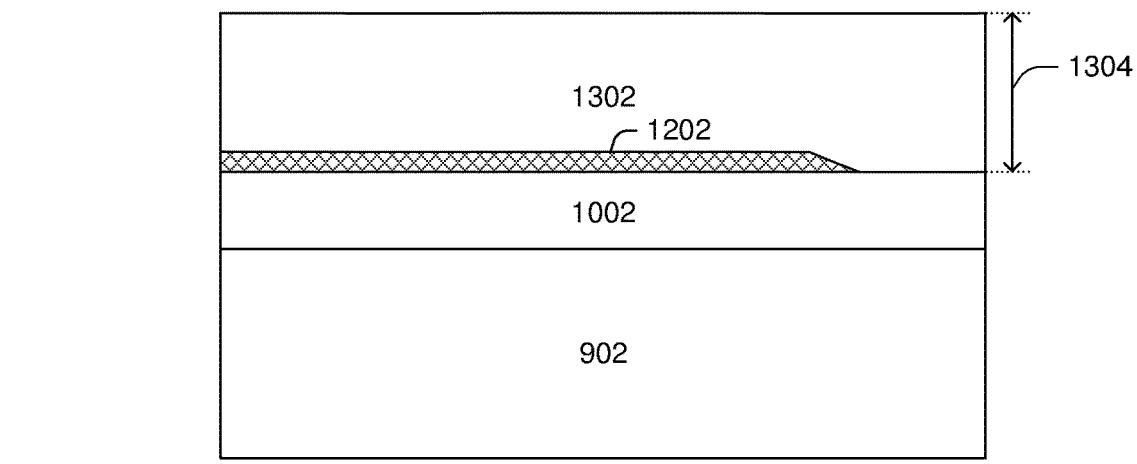
Figure 13C:
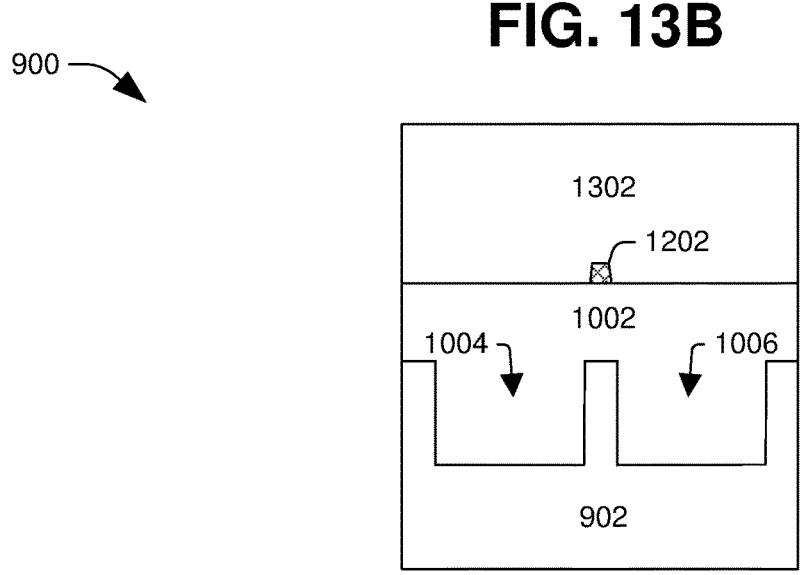

FIGS. 12A, 12B, and 12C illustrate a waveguide 1202 formed over the first dielectric layer 1002, according to some embodiments. In some embodiments, the semiconductor layer 1102 is patterned to form the waveguide 1202, such as using a photoresist (not shown). In some embodiments, the semiconductor layer 1102 is treated, such as having features, elements, etc. selectively formed therein, having dopants selectively implanted therein, etc., at least one of before or after being patterned. The photoresist is formed over the semiconductor layer 1102. The photoresist is formed by at least one of PVD, sputtering, CVD, LPCVD, ALCVD, UHVCVD, RPCVD, ALD, MBE, LPE, spin on, growth, or other suitable techniques. The photoresist comprises a light-sensitive material, where properties, such as solubility, of the photoresist are affected by light. The photoresist is a negative photoresist or a positive photoresist.

One or more etchants have a selectivity such that the one or more etchants remove or etch away one or more layers exposed or not covered by the photoresist at a greater rate than the one or more etchants remove or etch away the photoresist. In some embodiments, the one or more layers comprise the semiconductor layer 1102. An opening in the photoresist allows the one or more etchants to form a corresponding opening in the one or more layers under the photoresist, and thereby transfer a pattern in the photoresist to the one or more layers under the photoresist. The photoresist is removed after the pattern transfer, such as by at least one of CMP, etching, or other suitable techniques. According to some embodiments, the photoresist is at least one of stripped or washed away using at least one of HF, diluted HF, a chlorine compound such as $HCl_2$, $H_2S$, or other suitable material.

An etching process used to remove portions of the semiconductor layer 1102 to expose portions of the first dielectric layer 1002 and form the waveguide 1202 is at least one of a dry etching process, a wet etching process, an anisotropic etching process, an isotropic etching process, or another suitable process. The etching process uses at least one of HF, diluted HF, a chlorine compound such as $HCl_2$, $H_2S$, or other suitable material. Other processes and techniques for forming the waveguide 1202 are within the scope of the present disclosure.

In some embodiments, the waveguide 1202 has a thickness 1208 (shown in FIG. 12C) between about 2,000 angstroms and about 4,000 angstroms. Other values of the thickness 1208 are within the scope of the present disclosure. In some embodiments, the waveguide 1202 has at least one of a first tapered sidewall 1204 or a second tapered sidewall 1206. The first tapered sidewall 1204 of the waveguide 1202 has a first slope. The second tapered sidewall 1206 of the waveguide 1202 has a second slope. In some embodiments, the first slope is opposite in polarity relative to the second slope.

At least a portion of the waveguide 1202 extends in a direction 1212. In some embodiments, at least one of a cross-sectional area of the waveguide 1202 decreases along the direction 1212 or a cross-sectional area of a first portion 1210 of the waveguide 1202 decreases along the direction 1212. The first portion 1210 of the waveguide 1202 comprises an end point 1205 of the waveguide 1202, where the waveguide 1202 does not extend in the direction 1212 past the end point.

According to some embodiments, the first portion 1210 of the waveguide 1202 is formed having sidewalls according to a knife-edge taper. In some embodiments, at least one of a width 1214 (shown in FIG. 12A) of the first portion 1210 of the waveguide 1202 decreases along the direction 1212 or a height 1218 (shown in FIG. 12B) of a second portion 1216 of the waveguide 1202 decreases along the direction 1212. The second portion 1216 of the waveguide 1202 at least one of is part of the first portion 1210 of the waveguide 1202 or corresponds to the first portion 1210 of the waveguide 1202. Other values and configurations of at least one of the first portion 1210, the second portion 1216, the width 1214, or the height 1218 are within the scope of the present disclosure.

The waveguide 1202 at least one of is between the first dielectric structure 1004 and the second dielectric structure 1006, overlies the third portion 912 of the substrate 902 between the first dielectric structure 1004 and the second dielectric structure 1006, or is over the first dielectric structure 1004 and the second dielectric structure 1006. A portion of the waveguide 1202 extends in a direction 1213 away from at least one of the first sidewall 1010 of the first dielectric structure 1004 (shown in FIG. 10B) or first sidewall 1024 of the second dielectric structure 1006 (shown in FIG. 10E). A portion of the waveguide 1202, such as comprising the first portion 1210 (FIG. 12A) of the waveguide 1202, extends in the direction 1212 away from at least one of the second sidewall 1012 of the first dielectric structure 1004 (shown in FIG. 10B) or the second sidewall 1026 of the second dielectric structure 1006 (shown in FIG. 10E).

FIGS. 13A, 13B, 13C, 13D, and 13E illustrate a second dielectric layer 1302 formed over the first dielectric layer 1002, according to some embodiments. In some embodiments, the second dielectric layer 1302 overlies the first dielectric layer 1002 and the substrate 902. The second dielectric layer 1302 comprises at least one of silicon, nitride, oxide, such as $SiO_2$, or other suitable material. The second dielectric layer 1302 is formed by at least one of PVD, sputtering, CVD, LPCVD, ALCVD, UHVCVD, RPCVD, ALD, MBE, LPE, spin on, growth, or other suitable techniques. In some embodiments, the second dielectric layer 1302 has a thickness 1304 between about 20,000 angstroms and about 60,000 angstroms. Other values of the thickness 1304 are within the scope of the present disclosure.

In some embodiments, the second dielectric layer 1302 is in direct contact with a top surface of the first dielectric layer 1002. The second dielectric layer 1302 is different than the first dielectric layer 1002, such as having a different material composition, such that an interface is defined between the second dielectric layer 1302 and the first dielectric layer 1002. In some embodiments, the second dielectric layer 1302 does not have a material composition different than the first dielectric layer 1002. An interface is nevertheless defined between the second dielectric layer 1302 and the first dielectric layer 1002 because the second dielectric layer 1302 and the first dielectric layer 1002 are separate, different, etc. layers. In some embodiments, the second dielectric layer 1302 is in indirect contact with the top surface of the first dielectric layer 1002, where one or more layers, such as a buffer layer, are between the second dielectric layer 1302 and the first dielectric layer 1002.

The second dielectric layer 1302 at least one of overlies the waveguide 1202, is in direct contact with at least one of a sidewall or a top surface of the waveguide 1202, or is in indirect contact with the top surface of the waveguide 1202. In some embodiments, one or more layers, such as a buffer layer, are between the second dielectric layer 1302 and the waveguide 1202.

FIGS. 14A, 14B, and 14C illustrate formation of a third dielectric structure 1402, comprising a portion of the first dielectric layer 1002 and a portion of the second dielectric layer 1302, over the substrate 902, according to some embodiments. A portion of the waveguide 1202 is in the third dielectric structure 1402. In some embodiments, a distance 1404 (shown in FIG. 14B) between a bottom surface of the third dielectric structure 1402 and a top surface of the third dielectric structure 1402 is between about 30,000 angstroms and about 90,000 angstroms. Other values of the distance 1404 are within the scope of the present disclosure. In some embodiments, at least one of the bottom surface of the third dielectric structure 1402 corresponds to a bottom surface of the first dielectric layer 1002 or the top surface of the third dielectric structure 1402 corresponds to a top surface of the second dielectric layer 1302. In some embodiments, a distance 1406 (shown in FIG. 14C) between a first side 1408 of the third dielectric structure 1402 and a second side 1410 of the third dielectric structure 1402 is between about 20,000 angstroms and about 100,000 angstroms. Other values of the distance 1406 are within the scope of the present disclosure.

One or more portions of the first dielectric layer 1002 and the second dielectric layer 1302 are removed to at least one of form the third dielectric structure 1402 or expose the first side 1408 and the second side 1410 of the third dielectric structure 1402, such as by patterning the first dielectric layer 1002 and the second dielectric layer 1302 using a photoresist (not shown). The photoresist is formed over the second dielectric layer 1302. The photoresist is formed by at least one of PVD, sputtering, CVD, LPCVD, ALCVD, UHVCVD, RPCVD, ALD, MBE, LPE, spin on, growth, or other suitable techniques. The photoresist comprises a light-sensitive material, where properties, such as solubility, of the photoresist are affected by light. The photoresist is a negative photoresist or a positive photoresist.

One or more etchants have a selectivity such that the one or more etchants remove or etch away one or more layers exposed or not covered by the photoresist at a greater rate than the one or more etchants remove or etch away the photoresist. In some embodiments, the one or more layers comprise the second dielectric layer 1302 and the first dielectric layer 1002. An opening in the photoresist allows the one or more etchants to form a corresponding opening, such as an opening adjacent the first side 1408 of the third dielectric structure 1402 and an opening adjacent the second side 1410 of the third dielectric structure 1402, in the one or more layers under the photoresist, and thereby transfer a pattern in the photoresist to the one or more layers under the photoresist. The photoresist is removed after the pattern transfer, such as by at least one of CMP, etching, or other suitable techniques. According to some embodiments, the photoresist is at least one of stripped or washed away using at least one of HF, diluted HF, a chlorine compound such as $HCl_2$, $H_2S$, or other suitable material.

An etching process used to form the third dielectric structure 1402 is at least one of a dry etching process, a wet etching process, an anisotropic etching process, an isotropic etching process, or another suitable process. The etching process uses at least one of HF, diluted HF, a chlorine compound such as $HCl_2$, $H_2S$, or other suitable material. Other processes and techniques for forming the third dielectric structure 1402 are within the scope of the present disclosure.

FIGS. 15A, 15B, 15C, 15D, 15E, and 15F illustrate formation of a void 1502 between the third dielectric structure 1402 and the substrate 902, according to some embodiments. The second portion 910 (shown in FIGS. 9B, 9D, 10B, 10E) of the substrate 902 is removed to at least one of expose the bottom surface of the third dielectric structure 1402, expose a surface 1508 of the substrate 902 or create the void 1502. In some embodiments, the second portion 910 of the substrate 902 is removed to create the void 1502 using an etching process. The etching process is at least one of a dry etching process, a wet etching process, an anisotropic etching process, an isotropic etching process, or another suitable process. The etching process uses at least one of HF, diluted HF, a chlorine compound such as $HCl_2$, $H_2S$, or other suitable material. Other processes and techniques for forming the void 1502 are within the scope of the present disclosure.

In some embodiments, a distance 1506 (shown in FIG. 15B) between the bottom surface of the third dielectric structure 1402 and the surface 1508 of the substrate 902 is between about 20,000 angstroms and about 70,000 angstroms. The distance 1506 is about equal to at least one of the distance 1020 (shown in FIG. 10C) between the top surface of the substrate 902 and the bottom surface of the first dielectric structure 1004 or the distance 1036 (shown in FIG. 100) between the top surface of the substrate 902 and the bottom surface of the second dielectric structure 1006, or the distance 1506 is different than at least one of the distance 1020 or the distance 1036. Other values of the distance 1506 are within the scope of the present disclosure.

At least one of the first dielectric structure 1004 or the second dielectric structure 1006 inhibits removal of the first portion 908 (shown in FIGS. 9B, 9D, 10B, 10E) of the substrate 902 when the second portion 910 of the substrate 902 is removed to create the void 1502, such as by etching.

In some embodiments, the void 1502 is defined by at least one of the second sidewall 1012 of the first dielectric structure 1004 (shown in FIG. 15B) or the second sidewall 1026 of the second dielectric structure 1006 (shown in FIG. 15E). In some embodiments, at least one of a portion of the first dielectric structure 1004 or a portion of the second dielectric structure 1006 are removed when the second portion 910 of the substrate 902 is removed. One or more etchants remove or etch away portions of the substrate 902 at a greater rate than the one or more etchants remove or etch away at least one of the first dielectric structure 1004 or the second dielectric structure 1006.

In some embodiments, the void 1502 is defined by a third sidewall 1504 of the third portion 912 of the substrate 902 (shown in FIG. 15D) between the first dielectric structure 1004 and the second dielectric structure 1006.

FIGS. 16A, 16B, 16C, 16D, 16E, and 16F illustrate the semiconductor device 900 according to some embodiments where a portion 913 (FIG. 15D) of the third portion 912 of the substrate 902 is removed. In some embodiments, the portion 913 of the third portion 912 of the substrate 902 is removed when the second portion 910 of the substrate 902 is removed. The etching process used to remove the second portion 910 of the substrate 902 removes the portion 913 of the third portion 912 of the substrate 902. Removal of the portion 913 of the third portion 912 creates a second void 1602 (shown in FIGS. 16D and 16F) between the first dielectric structure 1004 and the second dielectric structure 1006. In some embodiments, the waveguide 1202 overlies the second void 1602. In some embodiments, the second void 1602 is defined by at least the fourth sidewall 1016 of the first dielectric structure 1004, the third sidewall 1032 of the second dielectric structure 1006, and the third sidewall 1504 of the third portion 912 of the substrate 902, which has been moved back, recessed, or moved from right to left on the page in FIG. 16D when the second portion 910 of the substrate 902 is removed. Other processes and techniques for forming the second void 1602 are within the scope of the present disclosure.

In some embodiments, an optical signal is propagated via at least some of the waveguide 1202. The waveguide 1202 is surrounded by material, such as portions of at least one of the first dielectric layer 1002 or the second dielectric layer 1302, having a refractive index less than a refractive index of the waveguide 1202. Where at least one of the first dielectric layer 1002 or the second dielectric layer 1302 comprise $SiO_2$, the refractive index of the material surrounding the waveguide 1202 is between about 1.4 and about 1.6. Other refractive indices of the material surrounding the waveguide 1202 are within the scope of the present disclosure. Where the waveguide 1202 is a silicon waveguide, the refractive index of the waveguide 1202 is between about 3.3 and about 3.7. Other refractive indices of the waveguide 1202 are within the scope of the present disclosure. At least one of the waveguide 1202 or the material surrounding the waveguide 1202 is configured to guide the optical signal into or through the waveguide 1202. The refractive index of the material surrounding the waveguide 1202 being less than the refractive index of the waveguide 1202 provides for at least some of the optical signal being reflected by the material surrounding the waveguide 1202 such that the optical signal at least one of remains within the waveguide 1202 or is inhibited from exiting from the waveguide 1202 so as to be propagated via the waveguide 1202. The optical signal is propagated in at least one of the direction 1212 or a direction different than, such as opposite, the direction 1212.

In some embodiments, the third dielectric structure 1402 is a coupler structure configured to transfer the optical signal to a component, such as at least one of an optical fiber, a semiconductor device, or a different component. In some embodiments, the optical signal is transferred from the waveguide 1202 to the component as a result of the optical signal reaching a portion of the waveguide 1202 that is less than a threshold size, such as at least a portion of the first portion 1210 of the waveguide 1202 (shown in FIG. 12A). The optical signal is transferred from the waveguide 1202 to the component as a result of the waveguide 1202, such as the first portion 1210 of the waveguide 1202, decreasing in size or tapering along the direction 1212. The optical signal is transferred from the waveguide 1202 to the component as a result of the cross-sectional area of the waveguide 1202, such as the cross-sectional area of the first portion 1210 of the waveguide 1202, decreasing in the direction 1212.

The void 1502 disposed between the third dielectric structure 1402 and the substrate 902 inhibits the optical signal from at least one of leaking out of the third dielectric structure 1402 or into the substrate 902, such as due to the refractive index of the void, such as from one or more gasses in the void. By implementing at least one of the first dielectric structure 1004 or the second dielectric structure 1006 in the semiconductor device 900, a length 1510 (shown in FIG. 15E) of the void 1502 does not exceed a first threshold length due to at least one of the first dielectric structure 1004 or the second dielectric structure 1006 inhibiting removal of the first portion 908 of the substrate 902 when the second portion 910 (shown in FIG. 9B, 9D, 10B, 10E) of the substrate 902 is removed to create the void 1502. The length 1510 exceeding the first threshold length allows the third dielectric structure 1402 to at least one of break or bend towards the substrate 902 due to insufficient structural support for the third dielectric structure 1402. Such deflection of the third dielectric structure 1402 causes a reduction in the optical signal being transferred from the waveguide 1202 to the component at least due to a misalignment of third dielectric structure 1402 with the component. By implementing at least one of the first dielectric structure 1004 or the second dielectric structure 1006 in the semiconductor device 900, the length 1510 of the void 1502 is not less than a second threshold length. The length 1510 not being less than the second threshold length inhibits leakage of the optical signal into the substrate 902, such as by having the void as opposed to the substrate 902 immediately under the third dielectric structure 1402.

Implementing at least one of the first dielectric structure 1004 or the second dielectric structure 1006 provides for controlling removal of the second portion 910 (shown in FIG. 9B, 9D, 10B, 10E) of the substrate 902 more accurately due to at least one of the first dielectric structure 1004 or the second dielectric structure 1006 inhibiting removal of the first portion 908 of the substrate 902. Implementing at least one of the first dielectric structure 1004 or the second dielectric structure 1006 provides for controlling removal of the second portion 910 of the substrate 902 such that the length 1510 of the void 1502 at least one of does not exceed the first threshold length or is not less than the second threshold length, and the alignment of the third dielectric structure 1402 with the component is thereby promoted and leakage of the optical signal into the substrate is inhibited.

Figure 17:
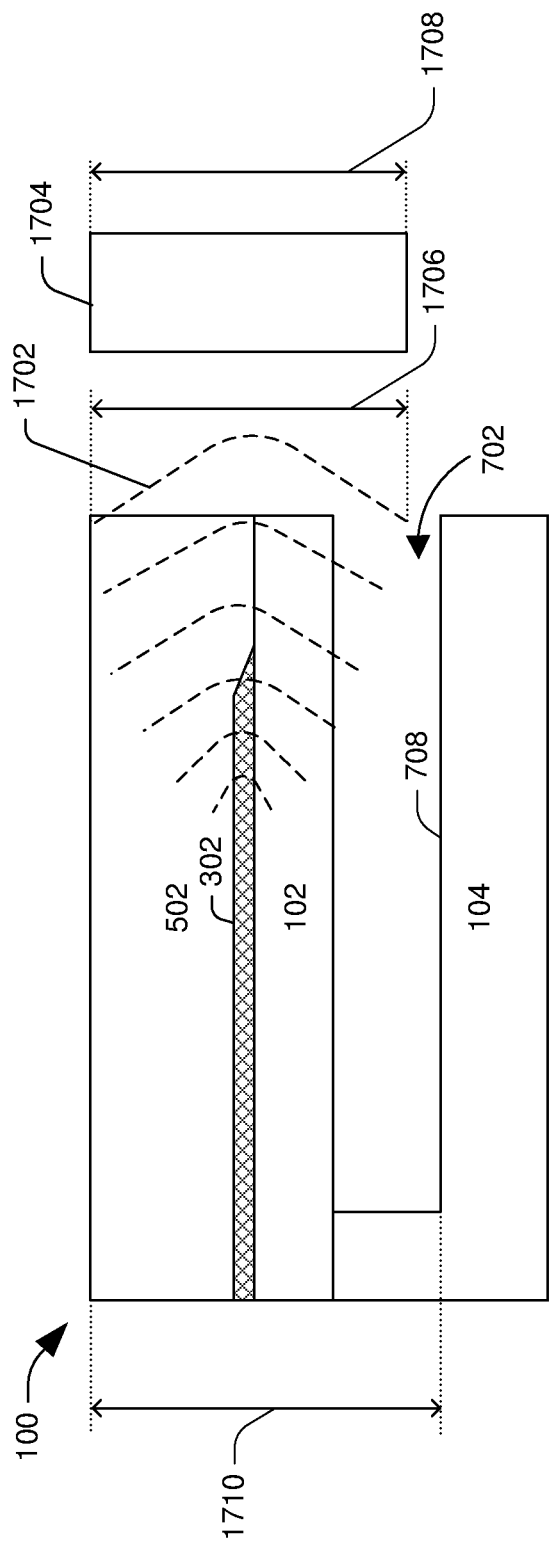
FIG. 17 illustrates a semiconductor device, in accordance with some embodiments.

FIG. 17 illustrates a cross-sectional view of the semiconductor device 100, according to some embodiments. While the device corresponds to that which is discussed with regard to FIGS. 1-8, the following discussion similarly applies to the semiconductor device 900 of FIGS. 9-16, according to some embodiments. In some embodiments, an optical signal is propagated via at least some of the waveguide 302. The optical signal 1702 is transferred from the waveguide 302 to a component 1704, such as at least one of an optical fiber, a semiconductor device, or a different component. The optical signal 1702 is transferred from the waveguide 302 to the component 1704 with an optical mode expansion such that a mode area of the optical signal 1702 is less than or equal to an area of the component 1704. A dimension 1706 of the optical signal 1702 is less than or equal to a dimension 1708 of the component 1704. Where the component 1704 is a cylindrical component, such as a cylindrical optical fiber, the dimension 1706 of the optical signal 1702 corresponds to a diameter of the optical signal 1702 and the dimension 1708 corresponds to a diameter of the component 1704. In some embodiments, a distance 1710 between a top surface of the second dielectric layer 502 and the surface 708 of the substrate 104 corresponds to at least the dimension 1708 of the component 1704. In some embodiments, the dimension 1708 of the component 1704 is between about 60,000 angstroms and about 100,000 angstroms. Other values of the dimension 1708 are within the scope of the present disclosure.

Figure 18:
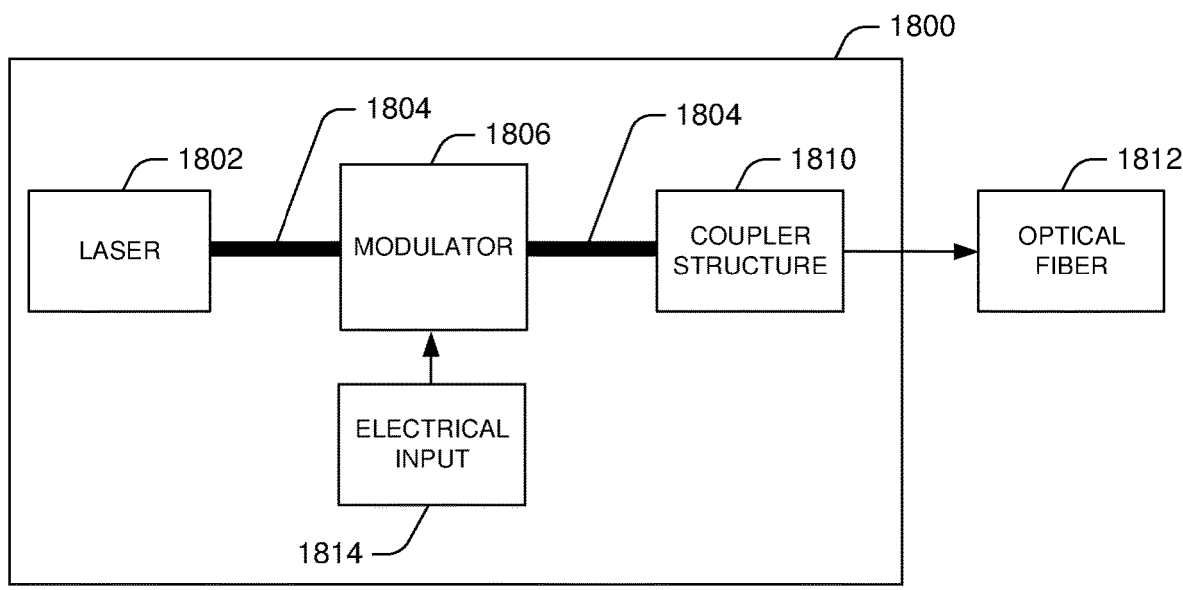
FIG. 18 illustrates a semiconductor device, in accordance with some embodiments.

FIG. 18 illustrates a semiconductor device 1800, according to some embodiments. The semiconductor device 1800 comprises a communication device, such as a transceiver. In some embodiments, the semiconductor device 1800 comprises a laser 1802 producing a signal, where the signal is propagated via a waveguide 1804, such as at least one of the waveguide 302 of the semiconductor device 100 or the waveguide 1202 of the semiconductor device 900, to a modulator structure 1806. In some embodiments, the modulator structure 1806 generates an optical signal using the signal and an electrical input 1814. The optical signal is propagated via the waveguide 1804 to a coupler structure 1810, such as at least one of the third dielectric structure 602 of the semiconductor device 100 or the third dielectric structure 1402 of the semiconductor device 900. The optical signal is transferred to an optical fiber 1812 via the coupler structure 1810. Even though FIG. 18 is described with respect to a transceiver, the semiconductor device 1800 comprises at least one of a transmitter, a receiver, a photonic device, such as a silicon-based photonic IC, or a different type of device, according to some embodiments.

Figure 19:
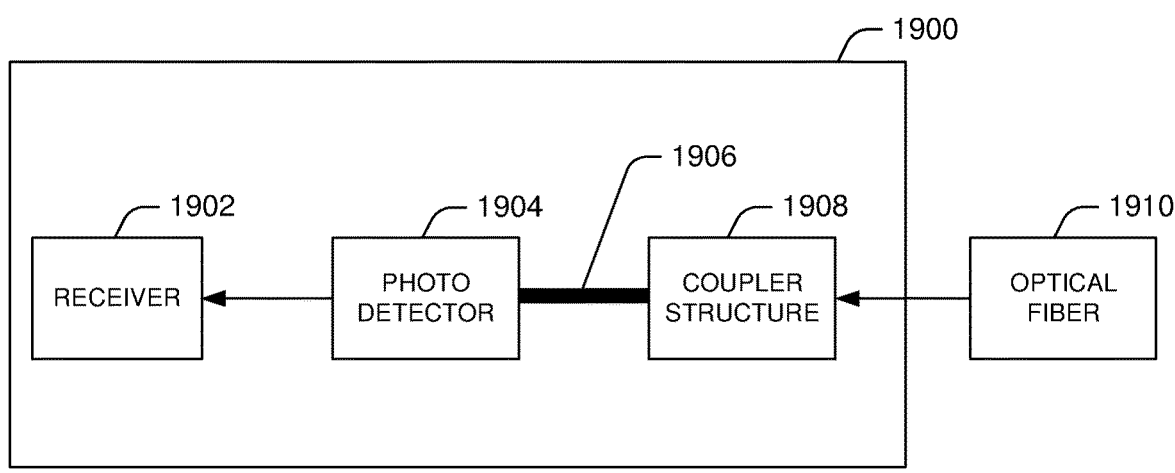
FIG. 19 illustrates a semiconductor device, in accordance with some embodiments.

FIG. 19 illustrates a semiconductor device 1900, according to some embodiments. The semiconductor device 1900 comprises a communication device, such as a transceiver. In some embodiments, the semiconductor device 1900 comprises a coupler structure 1908, such as at least one of the third dielectric structure 602 of the semiconductor device 100 or the third dielectric structure 1402 of the semiconductor device 900, where an optical signal is transferred from an optical fiber 1910 to the semiconductor device 1900 via the coupler structure 1908. The optical signal is propagated via a waveguide 1906, such as at least one of the waveguide 302 of the semiconductor device 100 or the waveguide 1202 of the semiconductor device 900, to a photodetector 1904. In some embodiments, the photodetector 1904 converts the optical signal to an electrical signal. In some embodiments, the photodetector 1904 transmits the electrical signal to a receiver 1902. Even though FIG. 19 is described with respect to a transceiver, the semiconductor device 1900 comprises at least one of a transmitter, a receiver, a photonic device, such as a silicon-based photonic IC, or a different type of device, according to some embodiments.

According to some embodiments, at least one of the one or more layers, features, structures, elements, etc. disclosed herein are in direct contact with another of the one or more layers, features, structures, elements, etc. disclosed herein. According to some embodiments, at least one of the one or more layers, features, structures, elements, etc. disclosed herein are not in direct contact with another of the one or more layers, features, structures, elements, etc. disclosed herein, such as where one or more intervening, separating, etc. layers, features, structures, elements, etc. exist.

In some embodiments, a semiconductor device is provided. The semiconductor device includes a waveguide over a substrate. The semiconductor device includes a first dielectric structure over the substrate, wherein a portion of the waveguide is in the first dielectric structure. The semiconductor device includes a second dielectric structure under the waveguide, wherein a first sidewall of the second dielectric structure is adjacent a first sidewall of the substrate.

In some embodiments, a method for forming a semiconductor device is provided. The method includes forming a first dielectric structure over a substrate, wherein a portion of a waveguide is in the first dielectric structure. The method includes forming a second dielectric structure under the waveguide. A first portion of the substrate is adjacent a first side of the second dielectric structure. A second portion of the substrate is adjacent a second side of the second dielectric structure. The method includes removing the first portion of the substrate to create a void between the first dielectric structure and the substrate, wherein the second dielectric structure inhibits removal of the second portion of the substrate.

In some embodiments, a method for forming a semiconductor device is provided. The method includes forming a first trench in a substrate. The method includes forming a first dielectric structure in the first trench. A first portion of the substrate is adjacent a first side of the first dielectric structure. A second portion of the substrate is adjacent a second side of the first dielectric structure. The method includes forming a second dielectric structure over the first portion of the substrate and the second portion of the substrate, wherein a portion of a waveguide is in the second dielectric structure. The method includes removing the first portion of the substrate to create a void between the second dielectric structure and the substrate, wherein the first dielectric structure inhibits removal of the second portion of the substrate.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for forming the layers, regions, features, elements, etc. mentioned herein, such as at least one of etching techniques, planarization techniques, implanting techniques, doping techniques, spin-on techniques, sputtering techniques, growth techniques, or deposition techniques such as chemical vapor deposition (CVD), for example.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A semiconductor device, comprising:
   a waveguide over a substrate, wherein a top surface of the substrate faces the waveguide;
   a first dielectric structure over the substrate, wherein a portion of the waveguide is in the first dielectric structure; and
   a second dielectric structure under the waveguide, wherein a first sidewall of the second dielectric structure is adjacent a first sidewall of the substrate such that a plane extending parallel to the top surface of the substrate intersects the first sidewall of the second dielectric structure and the first sidewall of the substrate.

2. The semiconductor device of claim 1, wherein a void is disposed between the first dielectric structure and the substrate.

3. The semiconductor device of claim 2, wherein
   the void is defined by a second sidewall of the second dielectric structure lying in a plane not parallel to the top surface of the substrate.

4. The semiconductor device of claim 3, wherein a first portion of the waveguide extends in a direction away from the first sidewall of the second dielectric structure and a second portion of the waveguide extends in a direction away from the second sidewall of the second dielectric structure.

5. The semiconductor device of claim 1, comprising:
   a third dielectric structure under the waveguide, wherein a first sidewall of the third dielectric structure is adjacent a second sidewall of the substrate.

6. The semiconductor device of claim 5, wherein:
   the waveguide overlies a first portion of the substrate; and
   the first portion of the substrate separates the second dielectric structure from the third dielectric structure.

7. The semiconductor device of claim 6, wherein:
   a second sidewall of the second dielectric structure is adjacent a first sidewall of the first portion of the substrate; and
   a second sidewall of the third dielectric structure is adjacent a second sidewall of the first portion of the substrate.

8. The semiconductor device of claim 7, wherein:
   a void is disposed between the first dielectric structure and the substrate; and the void is defined by a third sidewall of the second dielectric structure, a third sidewall of the third dielectric structure, and a third sidewall of the first portion of the substrate.

9. The semiconductor device of claim 5, wherein:

a first void is disposed between the second dielectric structure and the third dielectric structure;

the waveguide overlies the first void;

the first void is defined by a second sidewall of the second dielectric structure and a second sidewall of the third dielectric structure;

a second void is disposed between the first dielectric structure and the substrate; and the second void is defined by a third sidewall of the second dielectric structure and a third sidewall of the third dielectric structure.

10. The semiconductor device of claim 1, wherein:

the waveguide has a first tapered sidewall having a first slope and a second tapered sidewall having a second slope; and the second slope is opposite in polarity relative to the first slope.

11. A semiconductor device, comprising:

a waveguide over a substrate, wherein a top surface of the substrate faces the waveguide;

a first dielectric structure over the substrate, wherein a portion of the waveguide is in the first dielectric structure; and a second dielectric structure under the waveguide, wherein:

a first sidewall of the second dielectric structure faces a first sidewall of the substrate, and a void is defined by a second sidewall of the second dielectric structure, opposite the first sidewall of the second dielectric structure.

12. The semiconductor device of claim 11, wherein a plane extending parallel to the top surface of the substrate intersects the void and the substrate.

13. The semiconductor device of claim 11, wherein the void is further defined by the top surface of the substrate.

14. The semiconductor device of claim 13, wherein the void is further defined by a bottom surface of the first dielectric structure.

15. The semiconductor device of claim 11, wherein the void is further defined by a bottom surface of the first dielectric structure.

16. The semiconductor device of claim 11, wherein a plane extending parallel to the top surface of the substrate intersects the first sidewall of the second dielectric structure and the first sidewall of the substrate.

17. A semiconductor device, comprising:

a waveguide over a substrate, wherein a top surface of the substrate faces the waveguide;

a first dielectric structure over the substrate, wherein a portion of the waveguide is in the first dielectric structure; and a second dielectric structure under the waveguide, wherein a first sidewall of the second dielectric structure is in direct contact with a first sidewall of the substrate perpendicular to the top surface of the substrate.

18. The semiconductor device of claim 17, wherein a void is defined by a second sidewall of the second dielectric structure, opposite the first sidewall of the second dielectric structure.

19. The semiconductor device of claim 17, wherein a void is disposed between the first dielectric structure and the substrate.

20. The semiconductor device of claim 17, wherein the first sidewall of the substrate faces a void in the semiconductor device.

* * * * *